US012559313B2

(12) United States Patent
Austrheim et al.

(10) Patent No.: US 12,559,313 B2
(45) Date of Patent: Feb. 24, 2026

(54) DELIVERY VEHICLE WITH ROTATABLE CONTAINER CARRIER, AND METHODS OF USE THEREOF

(71) Applicant: Autostore Technology AS, Nedre Vats (NO)

(72) Inventors: Trond Austrheim, Etne (NO); Ole Alexander Mæhle, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 415 days.

(21) Appl. No.: 17/926,431

(22) PCT Filed: Jun. 3, 2021

(86) PCT No.: PCT/EP2021/064916
§ 371 (c)(1),
(2) Date: Nov. 18, 2022

(87) PCT Pub. No.: WO2021/249865
PCT Pub. Date: Dec. 16, 2021

(65) Prior Publication Data
US 2023/0183004 A1 Jun. 15, 2023

(30) Foreign Application Priority Data

Jun. 12, 2020 (NO) .................................... 20200695

(51) Int. Cl.
B65G 1/04 (2006.01)

(52) U.S. Cl.
CPC ......... B65G 1/0492 (2013.01); B65G 1/0471 (2013.01); B65G 1/0478 (2013.01)

(58) Field of Classification Search
CPC .. B65G 1/0471; B65G 1/0478; B65G 1/0492; B65G 1/0464; B65G 1/065; B65G 2203/0283
See application file for complete search history.

(56) References Cited

U.S. PATENT DOCUMENTS 1,563,293 A * 11/1925 Santangelo .......... A63H 33/007
446/237
2,569,053 A * 9/1951 Healy ...................... B66F 9/10
180/215
(Continued)

FOREIGN PATENT DOCUMENTS

CA 3099247 A1 12/2019
CA 3102674 A1 12/2019
(Continued)

OTHER PUBLICATIONS

International Search Report issued in PCT/EP2021/064916 on Sep. 17, 2021 (5 pages).
(Continued)

*Primary Examiner* — Glenn F Myers
(74) *Attorney, Agent, or Firm* — Baker Botts L.L.P.

(57) ABSTRACT

A remotely operated delivery vehicle for transport of a storage container includes a vehicle base, rolling device motors, a power source, a container carrier, and a rotational drive. The vehicle base includes rolling devices configured to move the remotely operated delivery vehicle in a horizontal plane along tracks of a rail system. The rail system includes a first set of parallel rails arranged in a first direction and a second set of parallel rails arranged in a second direction perpendicular to the first direction. The rolling device motors drive the rolling devices. The power source is configured to provide propulsion power to the rolling device motors. The container carrier is supported by the vehicle. The container carrier is configured to receive the storage container from above and/or from a side and onto or at least partly into the container carrier. The rotational drive is configured to rotate the container carrier, and any storage container supported thereon, relative the vehicle base.

18 Claims, 13 Drawing Sheets

(56) References Cited

U.S. PATENT DOCUMENTS

| | | | | |
|---|---|---|---|---|
| 10,605,623 | B1 * | 3/2020 | Mourlam | G01D 5/04 |
| 2014/0086714 | A1 * | 3/2014 | Malik | B65G 1/0492 |
| | | | | 414/273 |
| 2018/0093828 | A1 * | 4/2018 | Lindbo | A62C 3/002 |
| 2018/0370725 | A1 * | 12/2018 | Hognaland | B65G 1/0464 |
| 2019/0375590 | A1 | 12/2019 | Gravelle et al. | |
| 2020/0216298 | A1 * | 7/2020 | Gravelle | B66F 9/122 |

FOREIGN PATENT DOCUMENTS

| | | | |
|---|---|---|---|
| CN | 208716067 | U | 4/2019 |
| CN | 110356752 | A | 10/2019 |
| EP | 3287400 | A1 | 2/2018 |
| GB | 1213229 | A | 11/1970 |
| GB | 2336838 | A | 11/1999 |
| NO | 317366 | B1 | 10/2004 |
| NO | 2015/193278 | A1 | 12/2015 |
| NO | 344750 | B1 | 4/2020 |
| WO | 2005/001737 | A1 | 1/2005 |
| WO | 2014/075937 | A1 | 5/2014 |
| WO | 2014/090684 | A1 | 6/2014 |
| WO | 2018/146304 | A1 | 8/2018 |
| WO | 2019/086237 | A1 | 5/2019 |
| WO | 2019/232652 | A1 | 12/2019 |
| WO | 2019/238676 | A1 | 12/2019 |
| WO | 2019/238694 | A1 | 12/2019 |
| WO | 2022/111939 | A1 | 6/2022 |
| WO | 2022/223325 | A1 | 10/2022 |

OTHER PUBLICATIONS

Written Opinion of the International Searching Authority issued in PCT/EP2021/064916 on Sep. 17, 2021 (10 pages).

Written Opinion of the International Preliminary Examining Authority issued in PCT/EP2021/064916 mailed on Jun. 14, 2022 (5 pages).

Norwegian Search Report issued in NO 20200695 mailed on Jan. 12, 2021 (2 pages).

Pedersen, Henrik, Office Action for European Patent Application No. 21731948.2, dated Feb. 11, 2025, 7 pages, pub. by the EPO, Rijswijk Netherlands.

* cited by examiner

DELIVERY VEHICLE WITH ROTATABLE CONTAINER CARRIER, AND METHODS OF USE THEREOF

FIELD OF THE INVENTION

The invention relates to the field of automated storage and retrieval systems. In particular, the invention relates to a delivery vehicle and an automated storage and retrieval system comprising a delivery vehicle, where the delivery vehicle has a vehicle base and container carrier supported by the base, and wherein the container carrier can be rotated relative the vehicle base by means of a rotational drive.

BACKGROUND AND PRIOR ART

FIG. 1A discloses a typical prior art automated storage and retrieval system 1 with a framework structure 100 and FIGS. 2 and 3A discloses two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings/grid openings 112 in the grid cells 122 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3A, two wheels in each set are fully visible. The first set of wheels 201b,301b is arranged to engage with two adjacent rails of the first set of rails 110, and the second set of wheels 201c, 301c is arranged to engage with two adjacent rails of the second set of rails 111. At least one of the first and second sets of wheels 201b, 301b, 201c, 301c can be lifted and lowered, so that the first set of wheels 201b, 301b and/or the second set of wheels 201c, 301c can be engaged with the respective set of rails 110, 111 at any one time.

Each prior art container handling vehicle 201, 301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201, 301 so that the position of the gripping/engaging devices with respect to the vehicle 201,301 can be adjusted in a third direction Z which is orthogonal to the first direction X and the second direction Y. Part of the gripping device of the container handling vehicle 301 is shown in in FIG. 3A and is indicated with reference number 304. The gripping device of the container handling device 201 is located within the vehicle body 201a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1A, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1A, the storage container identified as 106' in FIG. 1A can be said to occupy storage position X=10, Y=2, Z=3. The container handling vehicles 201, 301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201, 301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3A shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves into which the wheels of the vehicles are inserted. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks (so-called "double tracks" which are described in relation to FIGS. 1B-1D below).

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1A, columns 119 and 120 are such special-purpose columns used by the container handling vehicles 201, 301 to drop off and/or pick up storage containers 106 so that they can be transported to an access station (not shown), where the storage containers 106 can be accessed from outside of the framework structure 100, or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1A, the first port column 119 may, for example, be a dedicated drop-off port column where the container handling vehicles 201, 301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. another framework structure or another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1A is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's lifting device (not shown), and transporting the storage container 106 to the drop-off port column 119.

If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201, 301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201, 301 positions the storage container 106 at the desired position. The removed storage containers may then be lowered back into the storage column 105, or relocated to other storage columns.

It is a potential drawback with the prior art solutions that, because the storage containers have a rectangular footprint, they need to be aligned in accordance with the orientation of the container handling vehicles and the storage positions in order for the storage containers to be handled by the container handling vehicles.

One objective of the invention is to provide a remotely operated delivery vehicle, and an associated storage and retrieval system, which can receive storage containers with different orientations. Furthermore, it is an objective to provide a remotely operated delivery vehicle able to transfer storage containers between automated storage and retrieval systems with different orientations.

Another objective of the invention is to provide a remotely operated delivery vehicle which can transfer storage containers to and from external conveyors arranged at any periphery of an automated storage and retrieval system.

SUMMARY OF THE INVENTION

The invention is set forth in the independent claims while the dependent claims describe alternatives of the invention.

It is described a remotely operated delivery vehicle for transport of a storage container, the remotely operated delivery vehicle comprising:
  a vehicle base comprising rolling devices configured to move the remotely operated delivery vehicle in a horizontal plane along tracks of a rail system comprising a first set of parallel rails arranged in a first direction and a second set of parallel rails arranged in a second direction perpendicular to the first direction, rolling device motors for driving the rolling devices, a power source configured to provide propulsion power to the rolling device motors, a container carrier supported by the vehicle base, wherein the container carrier is configured to receive the storage container from above and/or from a side and onto or at least partly into the container carrier, and a rotational drive configured to rotate the container carrier, and any storage container supported thereon, relative the vehicle base.

The container carrier is configured to receive the storage container from above and/or from a side because it is can be open and free of structure above and/or on at least one side of a container carrying area allowing a storage container to be positioned thereon or thereinto.

The container carrier may comprise a compartment for containing at least part of the storage container.

The vehicle base may, when in a horizontal plane, preferably have a longitudinal extension which is longer than a transverse extension. The vehicle base may therefore have a rectangular shape in the horizontal plane. The size of the vehicle base is dependent upon the distance between the tracks in the first direction and the tracks in the second direction of the rail system. For example, the distance between the tracks in the first direction can be shorter than the distance between the tracks in the second direction. Then the vehicle base will have a shorter extension in the first direction compared to the second direction.

The container carrier may preferably have the same rectangular shape in the horizontal plane as the vehicle base. For example, a longitudinal extension and transverse extension of the container carrier may preferably be equal to the longitudinal extension and the transverse extension of the vehicle base. The container carrier is formed such that any storage container supported thereon will rotate together with the container carrier, independent of the longitudinal and transverse extension of the storage container.

The compartment may comprise at least two sidewalls for sideways support of a storage container position therein, and the sidewalls may be equal to, lower or higher than the height of the storage container. If the sidewalls are not of full height compared to a storage container, the storage container is at received at least partly into the compartment of the container carrier.

The rotational drive may comprise a rotatable bearing in the form of a ring gear.

The ring gear may be of a diameter corresponding to over 50% of the width of the delivery vehicle. This has an effect that the width of the ring gear will stabilize the loads, particularly if there is some chance that the load may not be symmetrically arranged on the vehicle.

The rotational drive may be higher than an upper part of the vehicle body and supports the container carrier such that it is formed a gap between the upper part of the vehicle body and the container carrier.

The rotational drive may be mounted in a recess of the vehicle base.

The rotational drive may allow at least 90 degrees rotation of the container carrier relative the vehicle base, or alternatively 180 and/or up to 360 degrees.

The rotational drive may comprise an encoder to measure rotation of the container carrier relative the vehicle base.

The rotational drive may further comprise a gear motor and a gear rotationally connected to the gear motor, wherein the gear is rotationally connected to the rotatable bearing. Any combinations of gear and gear motor which render possible the rotation of the container carrier relative the vehicle base may be used.

The rotational drive may comprise a piston cylinder apparatus comprising a cylinder and a piston rod movable relative the cylinder, wherein the piston cylinder apparatus may be operable by a pressurized fluid flowing into and out of the cylinder.

The piston cylinder apparatus may comprise at least one pair of parallel cylinders with piston rods, wherein the cylinders may be connectable to the vehicle body and the piston rods are connectable on opposite sides of a common rotatable plate.

The cylinders of one pair of parallel cylinders may be oriented in opposite directions, such that when the cylinders in one pair of parallel cylinders are pressurized, the piston rod extends out from the cylinder and the common rotatable plate rotates. The skilled person will understand how this may be arranged in order to provide the required function.

It is further described an automated storage and retrieval system comprising:

a first automated storage and retrieval system comprising a first rail system having a first orientation, wherein the first rail system of the first automated storage and retrieval system comprises:

a container handling vehicle rail system comprising a first set of parallel rails arranged in a horizontal plane and extending in a first direction, and a second set of parallel rails arranged in the horizontal plane and extending in a second direction which is perpendicular to the first direction, wherein first and second sets of rails form a grid pattern in the horizontal plane comprising a plurality of adjacent container handling vehicle grid cells, each container handling vehicle grid cell comprising a container handling vehicle grid opening defined by a pair of neighboring rails of the first set of rails and a pair of neighboring rails of the second set of rails; and a plurality of stacks of storage containers arranged in storage columns located beneath the container handling vehicle rail system, wherein each storage column is located vertically below a container handling vehicle grid opening; wherein the automated storage and retrieval system further comprises:

a remotely operated delivery vehicle as defined above, and an intermediate rail system connected to the first automated storage and retrieval system, wherein the intermediate rail system comprises a first set of parallel rails arranged to guide movement of the remotely operated delivery vehicle in a first direction across the top of the intermediate rail system, and a second set of parallel rails arranged perpendicular to the first set of rails to guide movement of the remotely operated delivery vehicle in a second direction which is perpendicular to the first direction.

The automated storage and retrieval system may further comprise:

a second automated storage and retrieval system comprising a second rail system having a different, second, orientation relative the first orientation, wherein the second rail system of the second automated storage and retrieval system comprises:

a container handling vehicle rail system comprising a first set of parallel rails arranged in a horizontal plane and extending in a first direction, and a second set of parallel rails arranged in the horizontal plane and extending in a second direction which is perpendicular to the first direction, wherein first and second sets of rails form a grid pattern in the horizontal plane comprising a plurality of adjacent container handling vehicle grid cells, each container handling vehicle grid cell comprising a container handling vehicle grid opening defined by a pair of neighboring rails of the first set of rails and a pair of neighboring rails of the second set of rails; and a plurality of stacks of storage containers arranged in storage columns located beneath the container handling vehicle rail system, wherein each storage column is located vertically below a container handling vehicle grid opening; and wherein the intermediate rail system is connected to the second automated storage and retrieval system. As such, storage containers stored in automated storage and retrieval systems with different orientation can be transferred between these systems by means of the delivery vehicle with a rotational drive configured to rotate the container carrier.

The automated storage and retrieval system may comprise an external conveyor arranged at or close to the intermediate rail system, wherein the external conveyor has a different, second, orientation relative the first orientation.

It is further described a method of transferring a storage container between a first automated storage and retrieval system comprising a first rail system having a first orientation and a second automated storage and retrieval system comprising a second rail system having a different, i.e. second, orientation relative the first orientation, wherein the first and second rail systems of the first and second automated storage and retrieval systems both comprise:

a container handling vehicle rail system comprising a first set of parallel rails arranged in a horizontal plane and extending in a first direction, and a second set of parallel rails arranged in the horizontal plane and extending in a second direction which is perpendicular to the first direction, wherein first and second sets of rails form a grid pattern in the horizontal plane comprising a plurality of adjacent container handling vehicle grid cells, each container handling vehicle grid cell comprising a container handling vehicle grid opening defined by a pair of neighboring rails of the first set of rails and a pair of neighboring rails of the second set of rails; and a plurality of stacks of storage containers arranged in storage columns located beneath the container handling vehicle rail system, wherein each storage column is located vertically below a container handling vehicle grid opening; wherein the method comprises:

utilizing a first container handling vehicle operating on the first rail system to load a storage container on a container carrier of a remotely operated delivery vehicle as defined above, wherein the remotely operated delivery vehicle operates on an intermediate rail system connected to both the first and second automated storage and retrieval systems, wherein the container carrier and the first container handling vehicle are oriented in accordance with the first orientation, moving the remotely operated delivery vehicle to a position next to the second automated storage and retrieval system, rotating the container carrier, and thus the storage container, in accordance with the second orientation using the rotational drive, positioning a second container handling vehicle operating on the second rail system, and which has the second orientation, directly above the container carrier of the remotely operated delivery vehicle, lifting the storage container off the container carrier utilizing a lifting device of the second container handling vehicle.

After performing the of lifting the storage container off the container carrier utilizing a lifting device of the second container handling vehicle, the method may further comprise storing the storage container in a stack in the second automated storage and retrieval system.

It is further described a method of transferring a storage container between an automated storage and retrieval system comprising a rail system having a first orientation and an external conveyor having a different, second, orientation relative the first orientation, wherein the first automated storage and retrieval systems comprises:

a container handling vehicle rail system comprising a first set of parallel rails arranged in a horizontal plane and extending in a first direction, and a second set of parallel rails arranged in the horizontal plane and extending in a second direction which is perpendicular to the first direction, wherein the first and second sets of rails form a grid pattern in the horizontal plane comprising a plurality of adjacent container handling vehicle grid cells, each container handling vehicle grid cell comprising a container handling vehicle grid opening defined by a pair of neighboring rails of the first set of rails and a pair of neighboring rails of the second set of rails; and a plurality of stacks of storage containers arranged in storage columns located beneath the container handling vehicle rail system, wherein each storage column is located vertically below a container handling vehicle grid opening;

wherein the method comprises:

utilizing a first container handling vehicle to load a storage container on a container carrier of a remotely operated delivery vehicle as defined above, wherein the container carrier and the first container handling vehicle are oriented in accordance with the first orientation, rotating the container carrier of the remotely operated delivery vehicle, and thus the storage container, in accordance with the second orientation, using the rotational drive, moving the remotely operated delivery vehicle next to the external conveyor, unloading the storage container from the container carrier to the external conveyor.

The container carrier preferably comprises a conveyor for transferring the storage container from the delivery vehicle to the external conveyor.

It is further described use of a remotely operated delivery vehicle as defined above to rotate a storage container such as to transfer a storage container between a first and second automated storage and retrieval system with different orientation of rail systems.

Normally only minor misalignments are accepted between the lifting frame and gripping devices of the container handling vehicle in order to be able to retrieve storage containers. If a container handling vehicle has different orientation than the delivery vehicle, additional challenges with respect to alignment may occur as the cell positions are not oriented the same direction and the vehicles involved in the transfer cannot simply position themselves in the center of a cell in order to secure alignment. In order to solve this, different actions may be taken to ensure proper alignment, such as e.g.:

a) It is possible to make dedicated transfer cells on the intermediate rail system which are aligned with the connected first or second rail system such that the transfer of storage container(s) between the container handling vehicles and the delivery vehicle is eased and aligned.

b) Alternatively, or additionally, the delivery vehicle may have dedicated transfer positions where the rotated container carrier is directly below container handling vehicles in dedicated transfer columns.

For both a) and/or b) the transfer cells or transfer positions may have sensors/barriers etc. securing/ensuring that the delivery vehicle is properly positioned before the transfer of storage container is performed. I.e. there might be just one position 'drop off' position where everything can line up, where the midpoints of the respective grid cells for the vehicles involved in the transfer can be aligned.

For container handling vehicles with a footprint with a footprint larger than one grid cell but less than 1.5 grid cells (1.0 grid cell<footprint<1.5 grid cell), a different type of solution might be needed—it might require some of the cross rails to be missing in order to provide a wider slot to drop the container through, in order to allow for the non-alignment on the grid below.

The relative terms "upper", "lower", "below", "above", "higher" etc. shall be understood in their normal sense and as seen in a Cartesian coordinate system.

In the following, numerous specific details are introduced by way of example only to provide a thorough understanding of embodiments of the claimed system and vehicle. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

The following drawings are appended to facilitate the understanding of the invention by way of example only.

FIG. 1B shows a single track rail system, FIG. 1C shows a double track rail system and FIG. 1D shows a double rail system with the width and length of a container handling vehicle grid cell indicated;

FIG. 3B shows a part of the system having a delivery rail system with container delivery vehicles operating below the rail system of container handling vehicles and FIG. 3C shows an example of a container delivery vehicle having a storage container stored within;

In the drawings, like reference numerals have been used to indicate like parts, elements or features unless otherwise explicitly stated or implicitly understood from the context.

DETAILED DESCRIPTION OF THE INVENTION

Figure 1A:
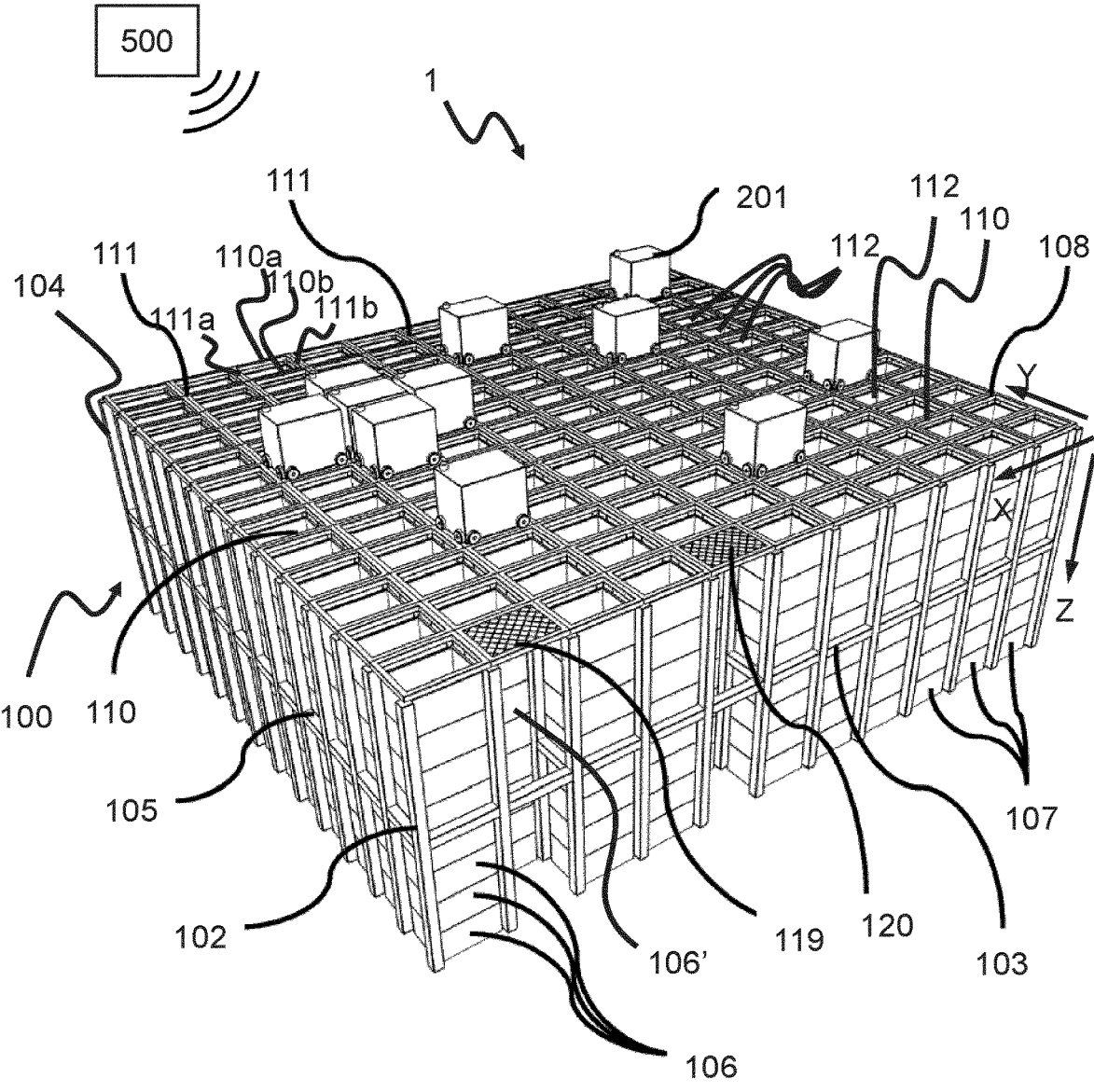
FIG. 1A is a perspective view of a framework structure of a prior art automated storage and retrieval system.

In the following, embodiments of the invention will be discussed in more detail by way of example only and with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIGS. 1A-1D, i.e. a number of upright members 102 and a number of horizontal members 103, which are supported by the upright members 102, where the framework structure 100 further comprises a first upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1A. For example, the framework structure 100 may have a horizontal extent of more than 700×700 columns and a storage depth of more than twelve containers.

Figures 1B, 1C, 1D:
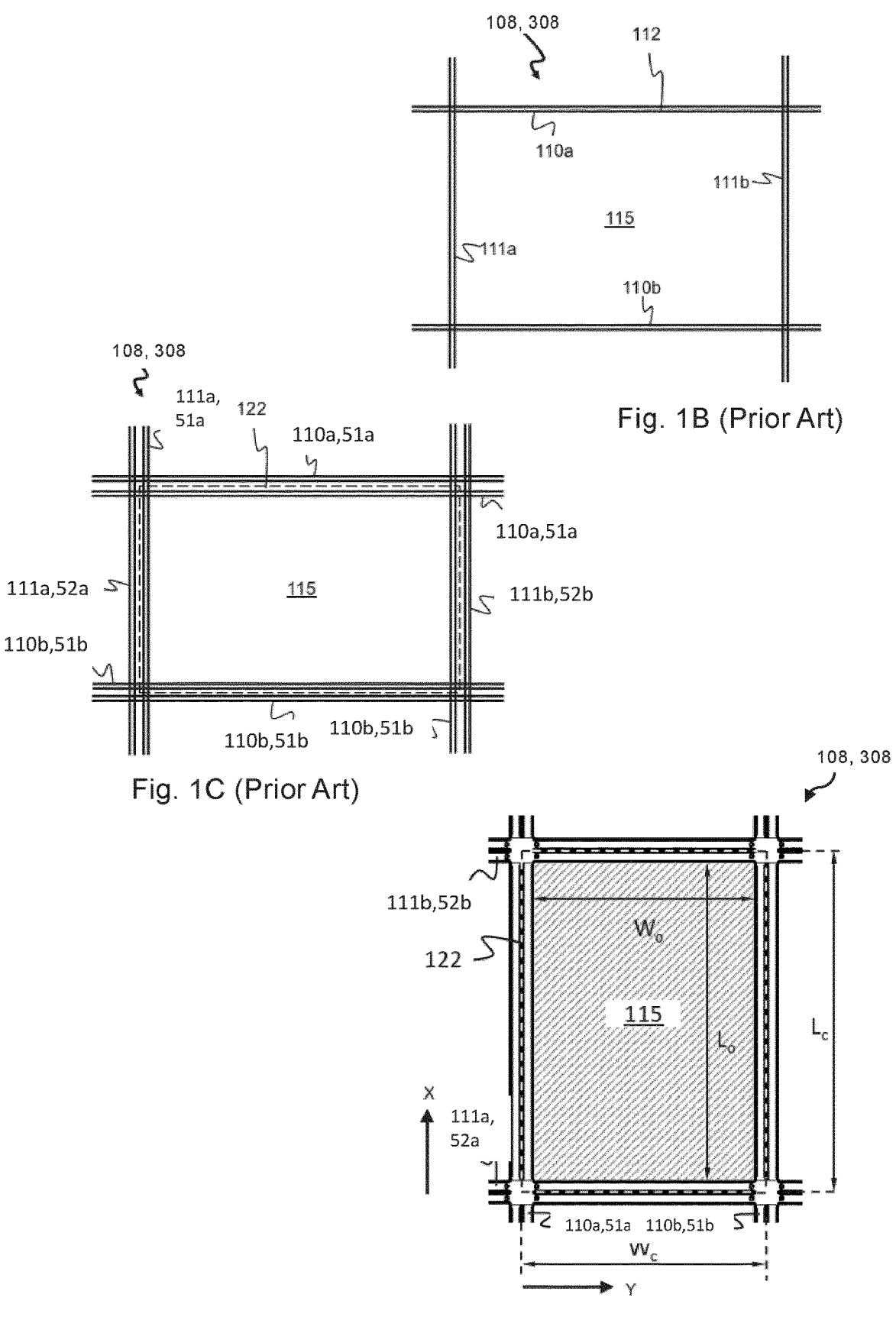
FIGS. 1B-D are top views of a container handling vehicle rail system, where

The rail system 108 may be a single rail (also denoted as a single track) system, as is shown in FIG. 1B. Alternatively, the rail system 108 may be a double rail (also denoted as a double track) system, as is shown in FIG. 1C, thus allowing a container handling vehicle 201 having a footprint generally corresponding to the lateral area defined by an access opening/grid column 112 to travel along a row of grid columns, even if another container handling vehicle 201 is positioned above a grid column neighboring that row.

Both the single and double track system, or a combination comprising a single and double track arrangement in a single rail system 108, form a grid pattern in the horizontal plane P comprising a plurality of rectangular and uniform grid locations or grid cells 122, where each grid cell 122 comprises a grid opening 115 being delimited by a pair of tracks 110a,110b of the first set of rails 110 and a pair of tracks 111a,111b of the second set of rails 111. In FIG. 1C the grid cell 122 is indicated by a dashed box. For example, the sections of the rail-based system being made of aluminium are the rails, and on the upper surface of the rails, there are a pair of tracks that the wheels of the vehicle run in. However, the sections could be separate rails each with a track.

Consequently, tracks 110a and 110b form pairs of rails defining parallel rows of grid cells running in the X direction, and tracks 111a and 111b form pairs of rails defining parallel rows of grid cells running in the Y direction.

As shown in FIG. 1D, each grid cell 122 has a width $W_c$ which is typically within the interval of 30 cm to 150 cm, and a length $L_c$ which is typically within the interval of 50 cm to 200 cm. Each grid opening 115 has a width $W_o$ and a length $L_o$ which is typically 2 cm to 10 cm less than the width $W_c$ and the length $L_c$ of the grid cell 122.

In the X and Y directions, neighboring grid cells are arranged in contact with each other such that there is no space therebetween.

Figures 2, 3A:
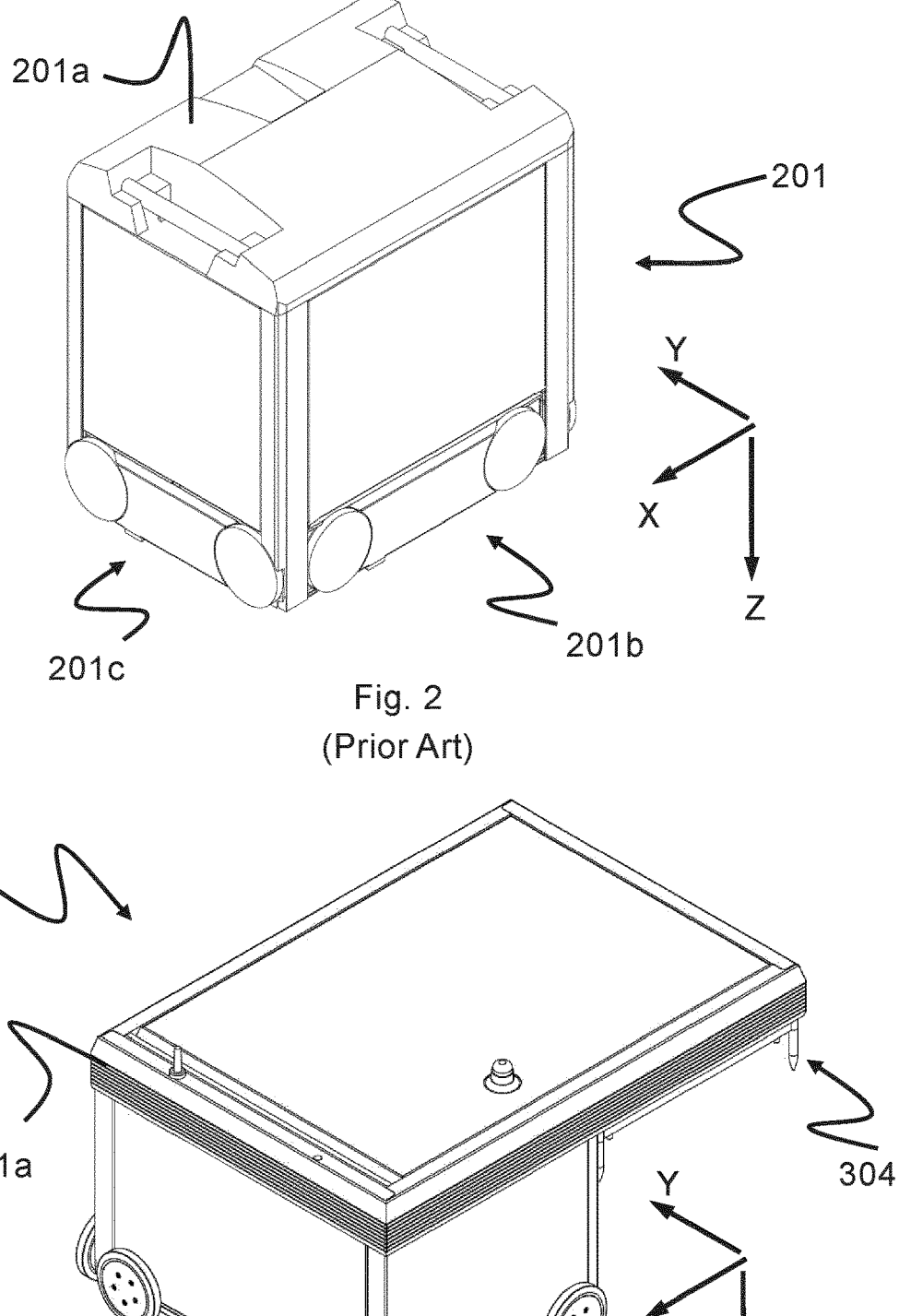
FIG. 2 is a perspective view of a prior art container handling vehicle having a centrally arranged cavity for carrying storage containers therein.
FIG. 3A is a perspective view of a prior art container handling vehicle having a cantilever for carrying storage containers underneath.

FIG. 3A is a perspective view of a prior art container handling vehicle 301 having a cantilever for carrying storage containers underneath.

Figure 3B:
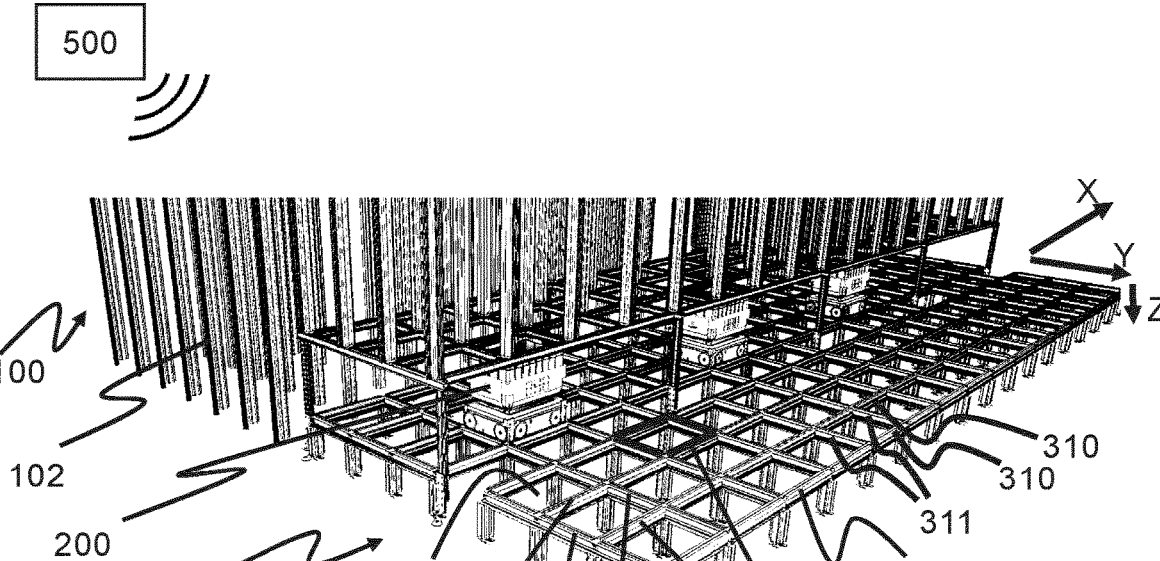
FIGS. 3B and 3C are perspective views of a prior art automated storage and retrieval system, where

A different automated storage and retrieval system 1 is shown in part in FIG. 3B. The upright members 102 constitute part of a framework structure 100 onto which a transport rail system 108 with a plurality of container handling vehicles 201,301 are operating.

Below this transport rail system 108, near the floor level, another framework structure 300 is shown which partly extends below some of the storage columns 105 of the framework structure 100. As for the other framework structure 100, a plurality of vehicles 30 may operate on a rail system 308 comprising a first set of parallel rails 310 directed in a first direction X and a second set of parallel rails 311 directed in a second direction Y perpendicular to the first direction X, thereby forming a grid pattern in the horizontal plane $P_L$ comprising a plurality of rectangular and uniform grid locations or grid cells 322. Each grid cell of this lower rail system 308 comprises a grid opening 315 being delimited by a pair of neighboring rails 51a,51b of the first set of rails 310 and a pair of neighboring rails 52a, 52b of the second set of rails 311.

The part of the lower rail system 308 that extends below the storage columns 105 are aligned such that its grid cells 322 are coincident with the grid cells 122 of the upper rail system 108.

Hence, with this particular alignment of the two rail systems 108,308, a storage container 106 being lowered down into a storage column 105 by a container handling vehicle 201, 301 can be received by a prior art delivery vehicle 200 configured to run on the rail system 308 and to receive storage containers 106 down from the storage column 105. In other words, the delivery vehicle 200 is configured to receive storage containers 106 from above, preferably directly from the container handling vehicle 201, 301.

Figure 3C:
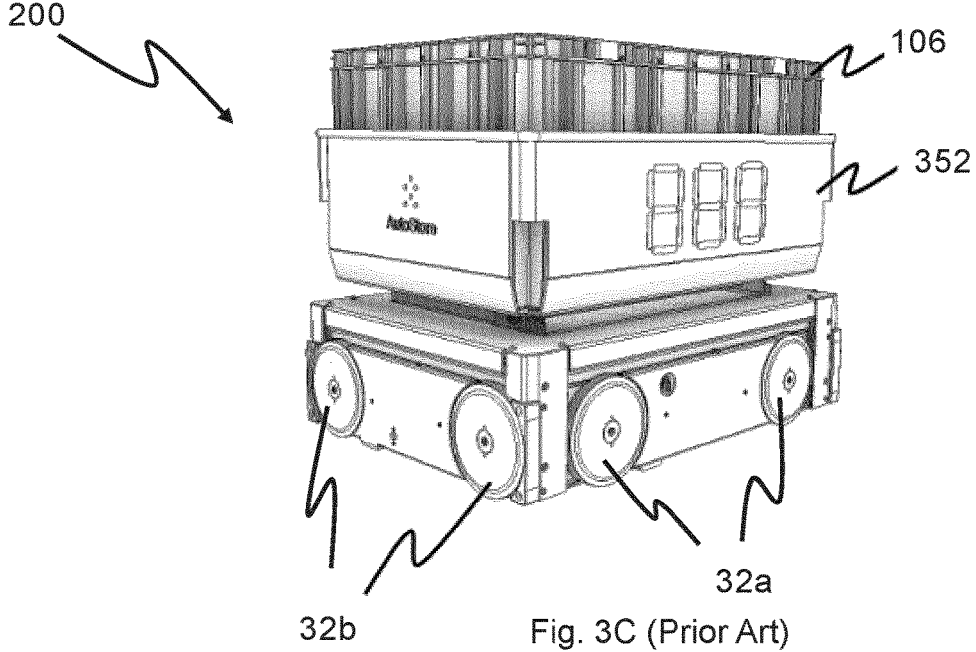

FIG. 3C shows an example of such a prior art delivery vehicle 200 comprising a wheel assembly 32a, 32b similar to the wheel assembly 201a, 201b, 301a, 301b described for the prior art container handling vehicle 201, 301 and a storage container support 352 for receiving and supporting a storage container 106 delivered by an above container handling vehicle 201, 301.

After having received a storage container 106, the delivery vehicle 200 may drive to a port or access station adjacent to the rail system 308 (not shown) for delivery of the storage container 106 for further handling and shipping.

Figure 4A:
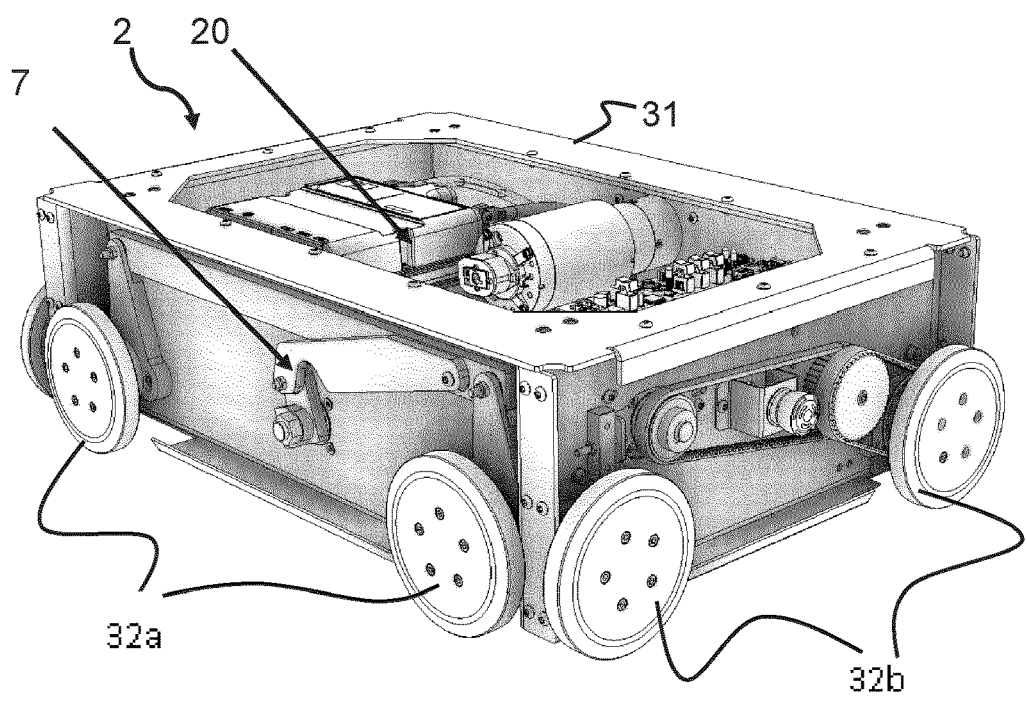
FIGS. 4A and 4B show an exemplary wheel base unit for the container handling vehicle.
Figure 4B:
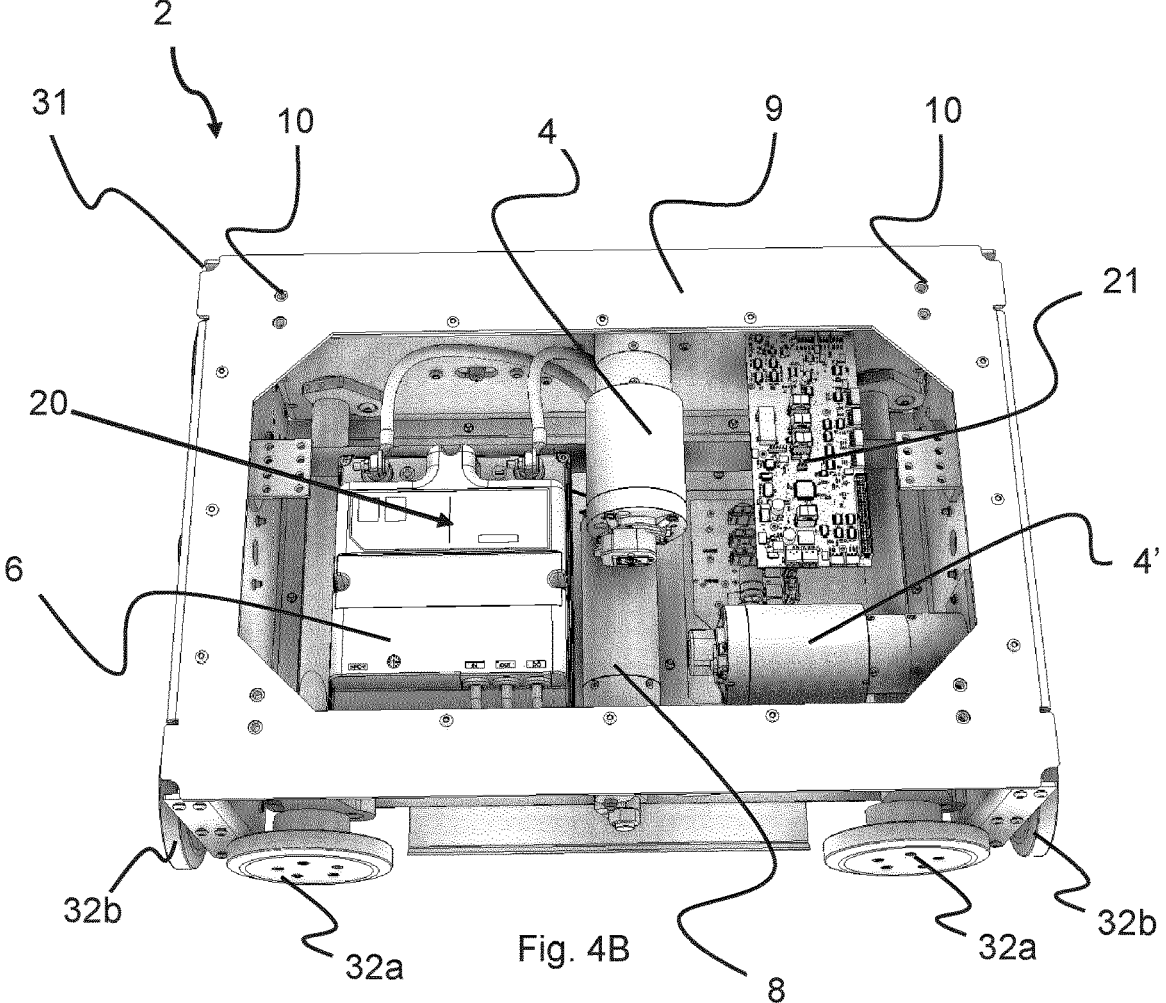

An exemplary wheel base unit for a remotely operated delivery vehicle 200 according to the invention is shown in FIGS. 4A and 4B. The wheel base unit 2 features a wheel arrangement 32a, 32b having a first set of wheels 32a for movement in a first direction upon a rail system and a second set of wheels 32b for movement in a second direction perpendicular to the first direction. Each set of wheels comprises two pairs of wheels arranged on opposite sides of the wheel base unit 2. To change the direction in which the wheel base unit may travel upon the rail system, one of the sets of wheels 32b is connected to a wheel displacement assembly 7. The wheel displacement assembly is able to lift and lower the connected set of wheels 32b relative to the other set of wheels 32a such that only the set of wheels travelling in a desired direction is in contact with the rail system. The wheel displacement assembly 7 is driven by an electric motor 8. Further, two electric motors 4,4', powered by a rechargeable battery 6, are connected to the set of wheels 32a,32b to move the wheel base unit in the desired direction.

Further referring to FIGS. 4A and 4B, the horizontal periphery of the wheel base unit 2 is dimensioned to fit within the horizontal area defined by a grid cell, such that two wheel base units 2 may pass each other on any adjacent grid cells of the rail system 108, 308. In other words, the wheel base unit 2 may have a footprint, i.e. an extent in the X and Y directions, which is generally equal to the horizontal area of a grid cell, i.e. the extent of a grid cell in the X and Y directions, e.g. as is described in WO2015/193278A1, the contents of which are incorporated herein by reference.

Referring to FIG. 4B, the wheel base unit 2 has a top panel/flange 9 (i.e. an upper surface) configured as a connecting interface for the container carrier. The top panel 9 has a centre opening 20 and features multiple through-holes 10 (i.e. connecting elements) suitable for a bolt connection via corresponding through-holes in a lower section of the container carrier. In other embodiments, the connecting elements of the top panel 9 may for instance be threaded pins for interaction with the through-holes of the lower section. The presence of a centre opening 20 is advantageous as it provides access to internal components of the wheel base unit 2, such as the rechargeable battery 6 and an electronic control system 21.

Figures 5A, 5B:
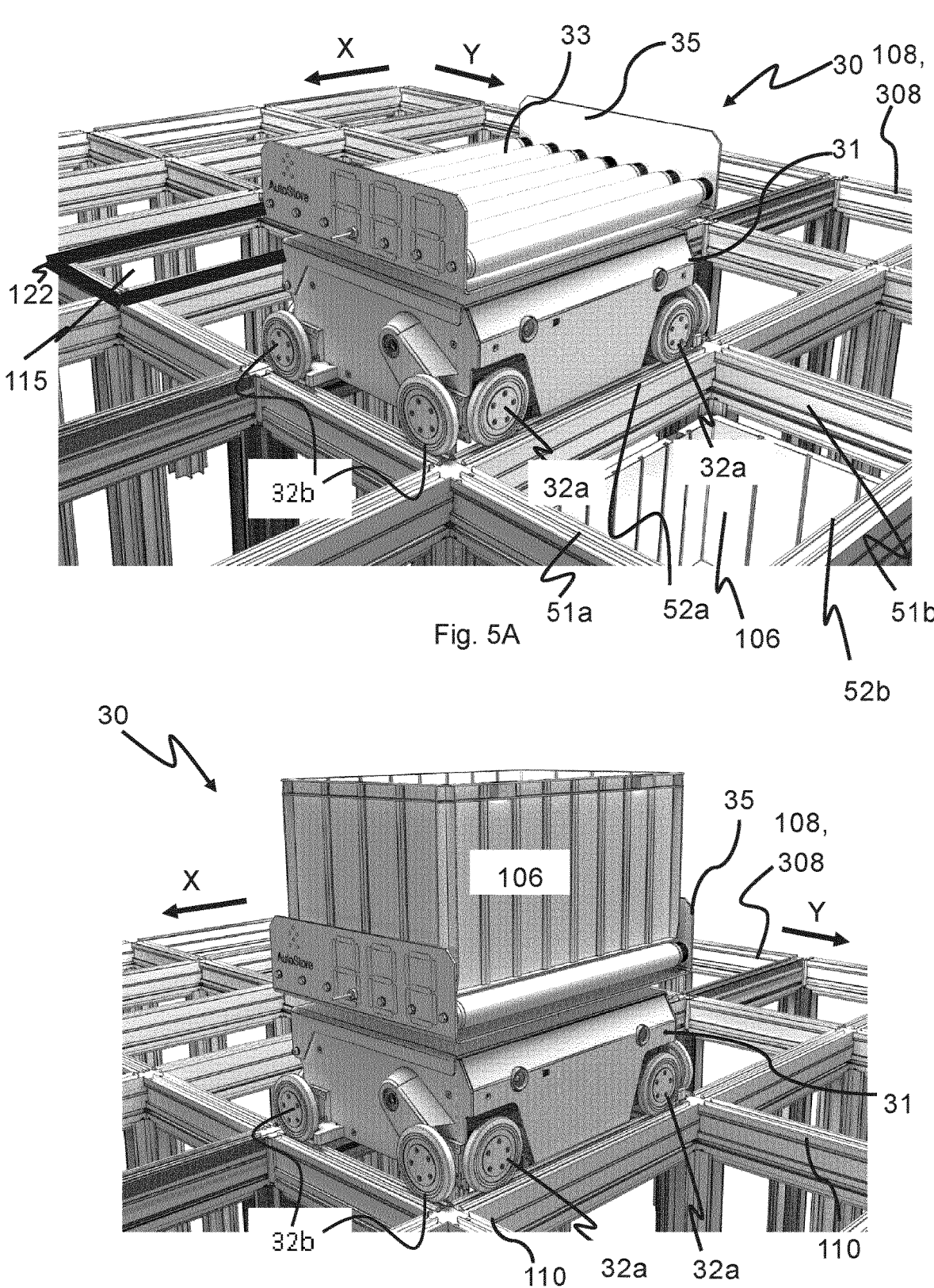
FIG. 5A shows an exemplary remotely operated delivery vehicle according to the invention, with a container carrier oriented in the same direction as the vehicle base.
FIG. 5B shows the remotely operated delivery vehicle of FIG. 5A carrying a storage container.

FIG. 5A shows a remotely operated delivery vehicle 30 according to the invention, with a container carrier 35 oriented in the same direction as the vehicle base 2. The container carrier 35 is adapted to support and transport a storage container 106 (not shown). The vehicle base 2, also denoted as wheel base unit 2 (when referring to FIGS. 4A and 4B), comprises rolling devices 32a, 32b configured to move the remotely operated delivery vehicle 30 in a horizontal plane along tracks of a rail system 108,308 comprising a first set of parallel rails 51,110 arranged in a first direction X and a second set of parallel rails 52,111 arranged in a second direction Y perpendicular to the first direction X, wherein the first and second sets of rails 51,110, 52,111 form a grid pattern in the horizontal plane comprising a plurality of adjacent container handling vehicle grid cells 122, each container handling vehicle grid cell 122 comprising a container handling vehicle grid opening 115 defined by a pair of neighboring rails of the first set of rails (110) and a pair of neighboring rails of the second set of rails. A plurality of stacks (see FIG. 1A) of storage containers 106 are arranged in storage columns (see FIG. 1A) located beneath the container handling vehicle rail system 108, wherein each storage column is located vertically below a container handling vehicle grid opening. In FIG. 5A, an uppermost storage container 106 of a stack of storage containers is disclosed below the rail system 108.

The vehicle base 2 comprises rolling device motors (not shown in FIG. 5A, see FIGS. 4A and 4B) for driving the rolling devices 32a, 32b, and a power source (not shown in FIG. 5A, see FIGS. 4A and 4B) configured to provide propulsion power to the rolling device motors. The container carrier 35 is supported by the vehicle base 2 and the container carrier 35 is configured to receive the storage container 106 from above and/or from a side and onto or at least partly into the container carrier 35. In FIG. 5A, the container carrier 35 is disclosed with a conveyor 33. The conveyor 33 is adapted to transport storage container 106 onto the container carrier 35 and off the container carrier 35 in a mainly horizontal direction, i.e. sideways. The container carrier 35 disclosed is open and is free of structure above a container carrying area such that a storage container can be received from above and/or from a side. However, although not disclosed, it is also possible to provide the container carrier 35 with a closed upper end and at least one open side such that storage containers 106 can only enter the container carrying area from a side. Similarly, as indicated in the prior art delivery vehicle 200 in FIG. 3C, the container carrier 35 can comprise sidewalls on all sides (i.e. all four sides in FIG. 3C) and open (i.e. free of structure above) such that 106 can only enter the container carrying area from above.

FIG. 5B shows the remotely operated delivery vehicle 30 of FIG. 5A carrying a storage container 106.

Figure 5C:
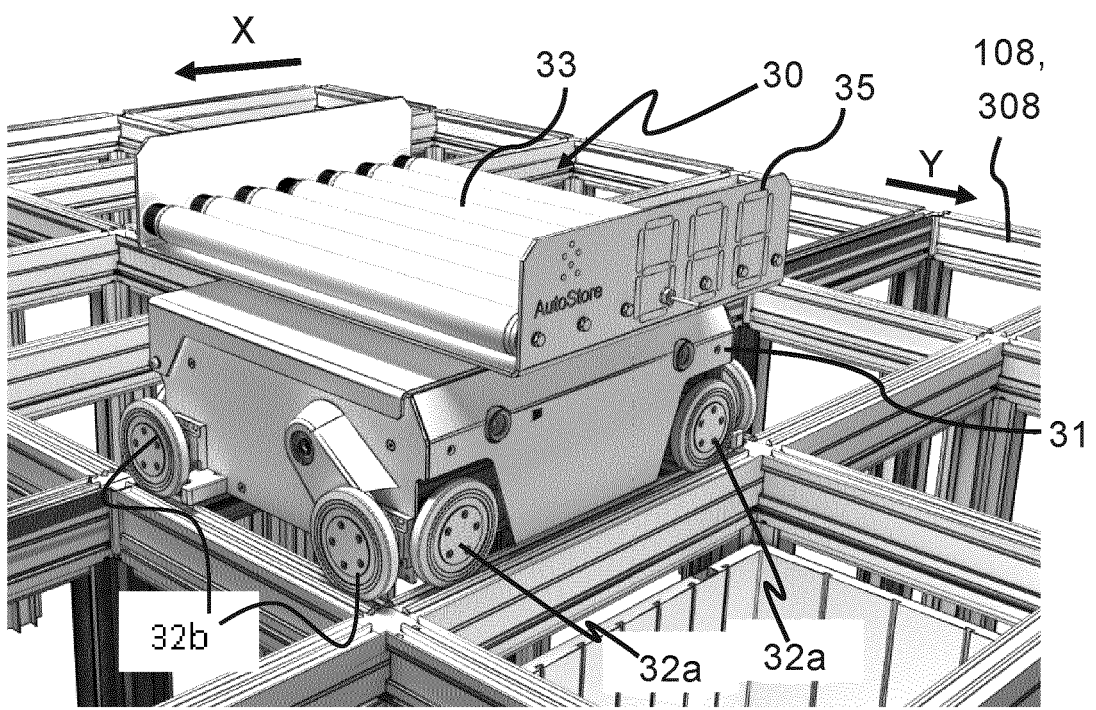
FIG. 5C shows the remotely operated delivery vehicle of FIG. 5A with the container carrier rotated 90 degrees relative the vehicle base.

FIG. 5C shows the remotely operated delivery vehicle 30 of FIG. 5A with the container carrier 35 rotated 90 degrees relative the vehicle base 2.

Figure 5D:
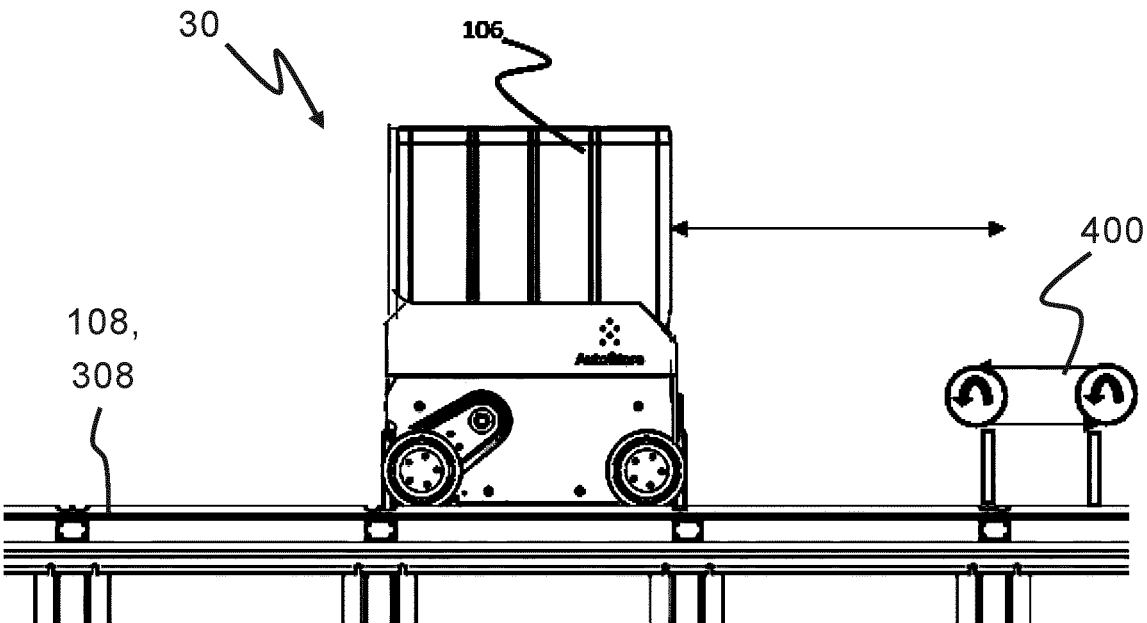
FIG. 5D shows an example of a remotely operated delivery vehicle according to the invention which is about to position itself next to an external conveyor for transferring the storage container carried by the container carrier to the external conveyor.

FIG. 5D shows an example of a remotely operated delivery vehicle 30 according to the invention which is about to position itself next to an external conveyor for transferring the storage container carried by the container carrier to the external conveyor. A method of transferring a storage container 106 between an automated storage and retrieval system comprising a rail system 108, 308 having a first orientation and an external conveyor 400 having a different, i.e. second, orientation relative the first orientation, may comprise:

utilizing a first container handling vehicle (not shown in FIG. 5D) to load a storage container 106 on a container carrier 35 of the remotely operated delivery vehicle 30, where the container carrier 35 and the first container handling vehicle 30 are oriented in accordance with the first orientation, rotating the container carrier 35 of the remotely operated delivery vehicle 30, and thus the storage container 106, in accordance with the second orientation using a rotational drive, moving the remotely operated delivery 30 vehicle next to the external conveyor 400, unloading the storage container from the container carrier 35 to the external conveyor 400. This step is preferably done using a conveyor (see e.g. FIG. 5C, element 33) on the remotely operated delivery vehicle 30.

Figures 6A, 6B:
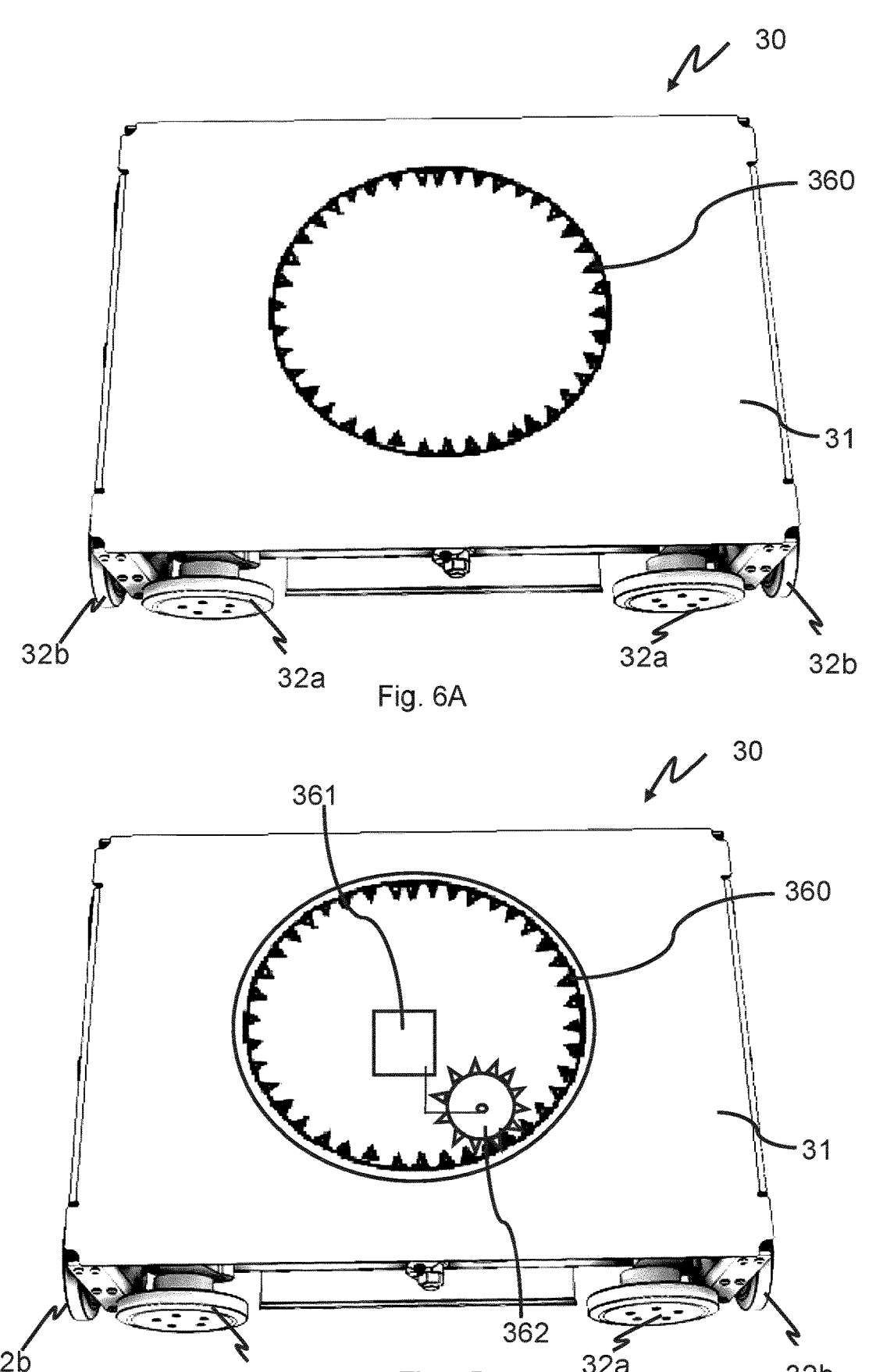
FIG. 6A shows a first embodiment of a rotational drive comprising a ring gear for rotating the container carrier relative the vehicle base.
FIG. 6B shows a possible connection of a gear motor and a gear for rotating the ring gear in FIG. 6A.

FIG. 6A shows a first embodiment of a rotational drive comprising a ring gear 360 for rotating the container carrier 35 relative the vehicle base 2.

FIG. 6B shows a possible connection of a gear motor 361 and a gear 362 for rotating the ring gear 360 in FIG. 6A. The gear 362 is disclosed arranged within the periphery of the ring gear 360 and is configured with mating teeth for mating with the teeth on the ring gear 360, thereby rendering possible the rotation of the container carrier 35 (not shown in FIG. 6B). The container carrier 35 is to be mounted on the ring gear 360, thereby following any rotational movement of the ring gear 360 such that any storage container(s) carried by the container carrier 35 is/are also rotated. Alternatively, the gear 362 can be arranged outside the periphery of the gear 360.

Figures 7A, 7B, 7C:
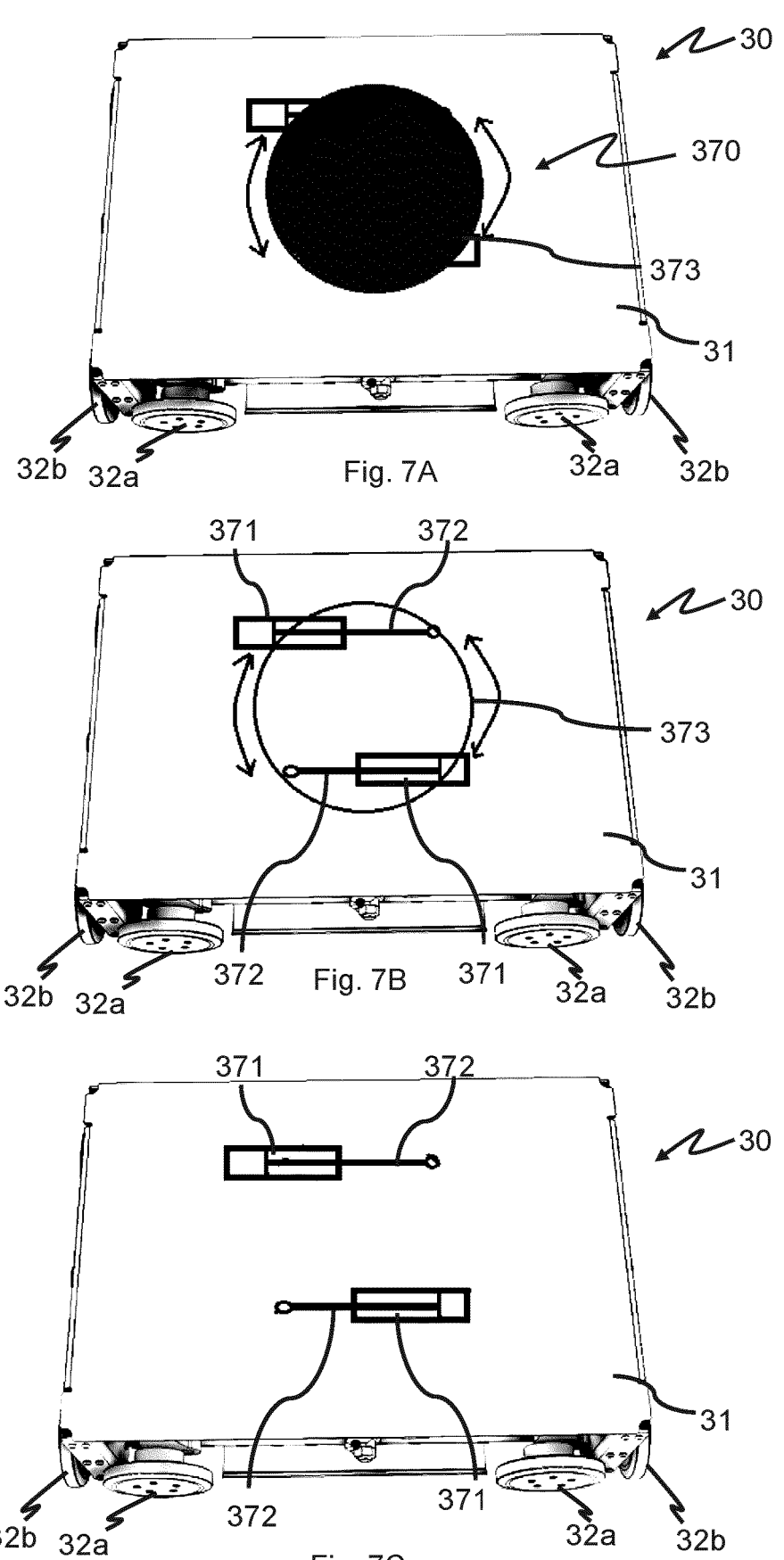
FIG. 7A-7C show a second embodiment of a rotational drive comprising a piston cylinder apparatus comprising two cylinders and two piston rods movable relative the cylinders for rotating the container carrier relative the vehicle base.

FIG. 7A-7C show a second embodiment of a rotational drive comprising a piston cylinder apparatus 370 comprising a pair of cylinders 371 and piston rods 372 movable relative the cylinders 371 for rotating the container carrier relative the vehicle base 2. The cylinders 371 are connectable to the vehicle body 2 and the piston rods 372 are connectable on opposite sides of a common rotatable plate 373. The cylinders 371 of one pair of parallel cylinders 371 are oriented in opposite directions, such that when the cylinders 371 in one pair of parallel cylinders 371 are pressurized, the piston rods 372 extend out from the cylinders 371 and the common rotatable plate 373 rotates. The container carrier 35 (not shown in FIGS. 7A-7C) can be mounted on the plate 373, such that when the piston rods 372 extend and retract, plate 373 rotates clockwise and counter-clockwise, respectively, and thus the container carrier rotates. The piston cylinder apparatus 370 is operable by a pressurized fluid flowing into and out of the cylinder 371 thereby extending the piston rod 372 from and into the cylinder 371.

Figure 8A:
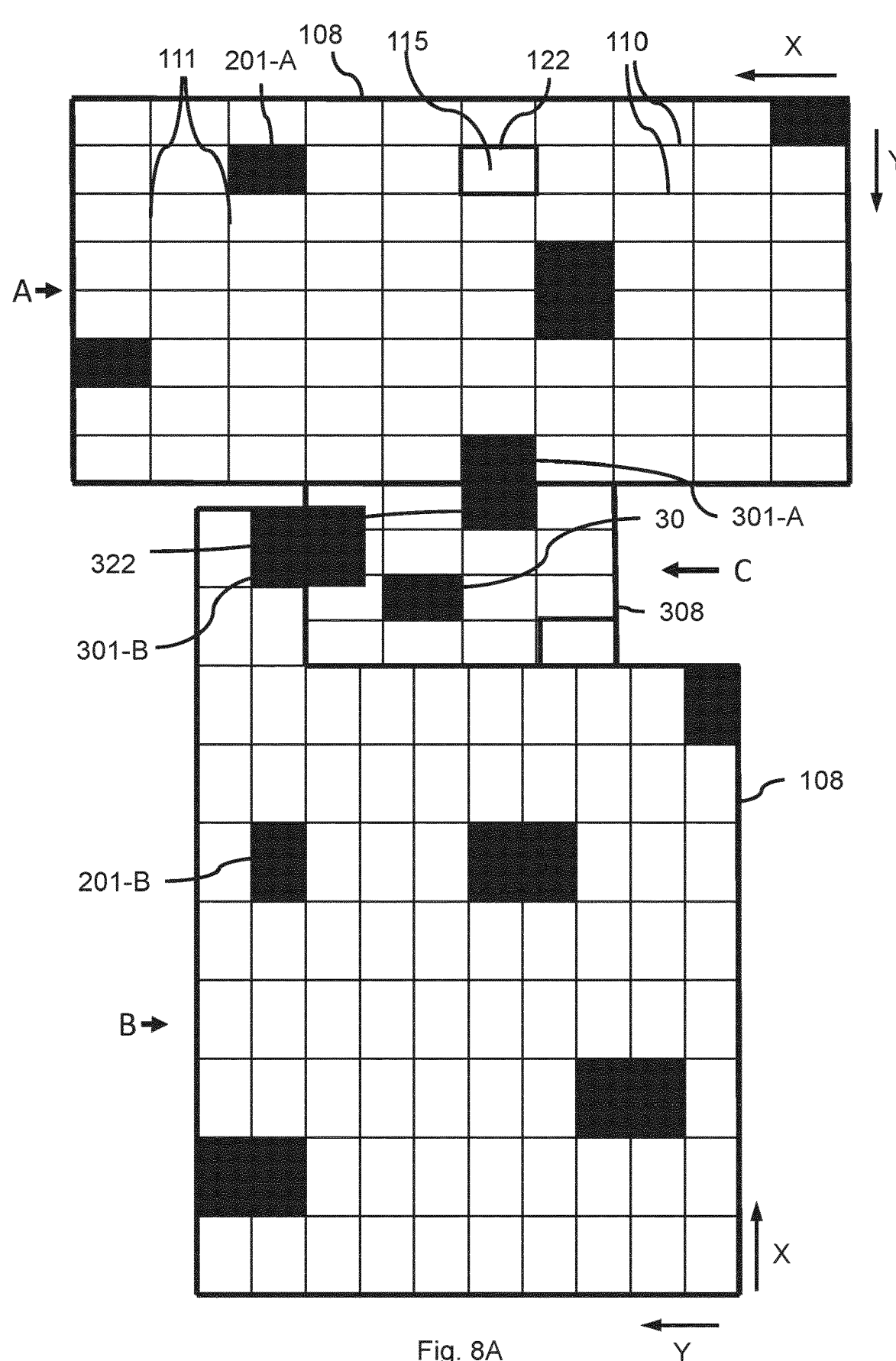
FIGS. 8A-8C are top views of an example of how a storage container can be transferred between a first automated storage and retrieval system comprising a rail system having a first orientation and a second automated storage and retrieval system comprising a rail system having a different, i.e. second, orientation relative the first orientation, utilizing a preferred remotely operated delivery vehicle according to the invention.
Figure 8B:
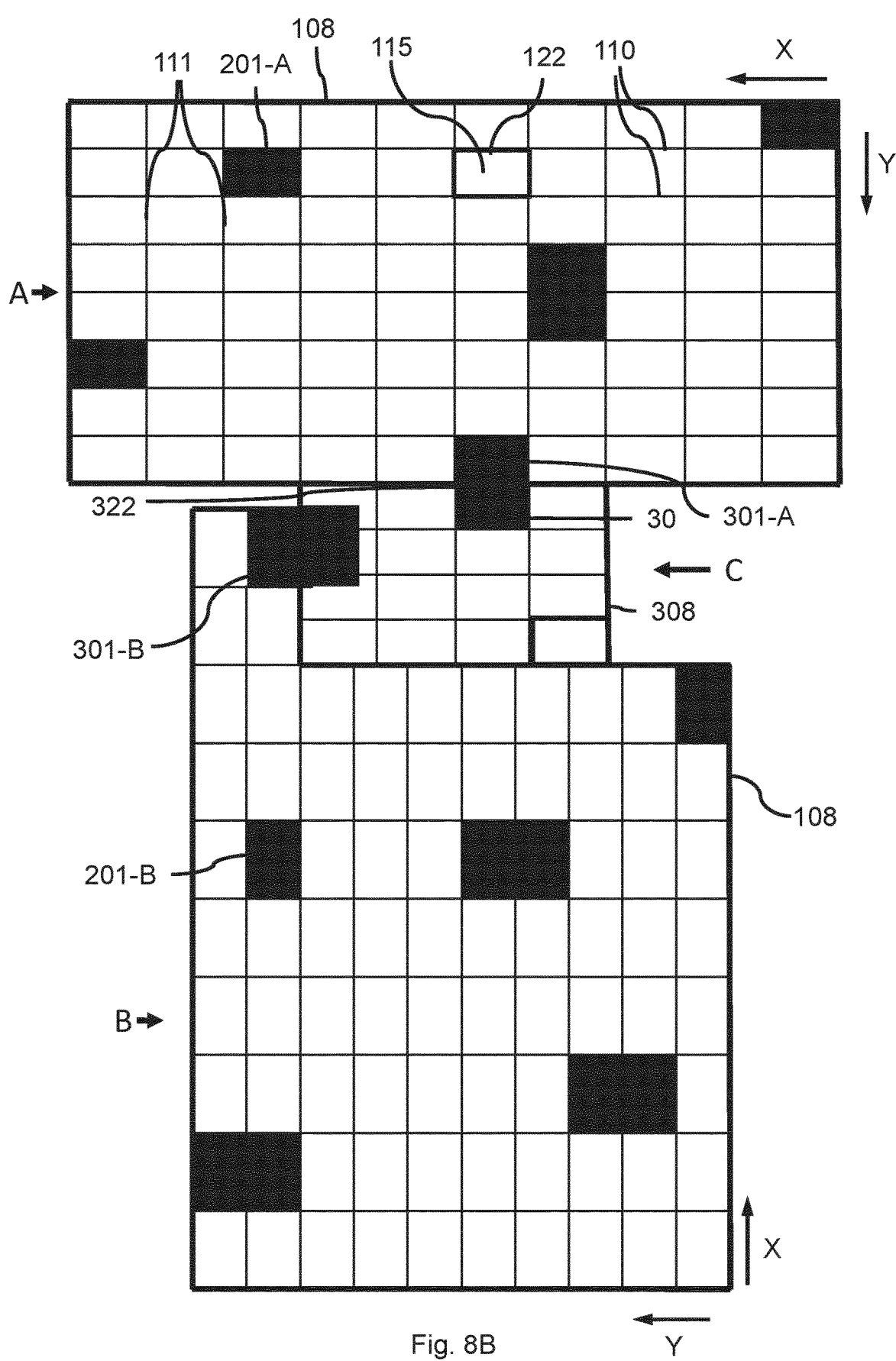
Figure 8C:
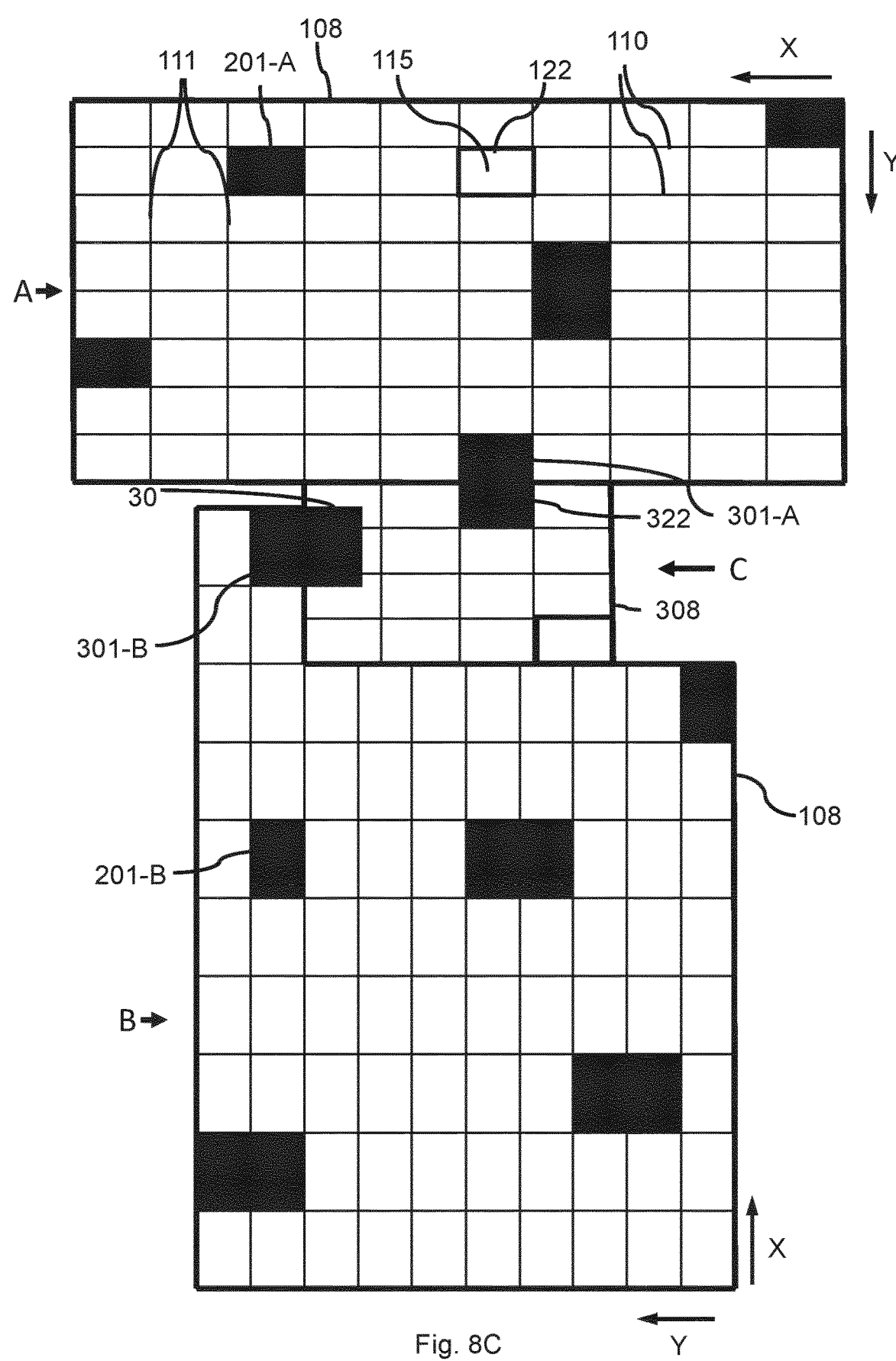

FIGS. 8A-8C are top views of an example of how a storage container 106 can be transferred between a first automated storage and retrieval system comprising a rail system A having a first orientation, and a second automated storage and retrieval system comprising a rail system B having a different, i.e. second, orientation relative the first orientation, utilizing a remotely operated delivery vehicle according to the invention. The remotely operated vehicle 30 operates on an intermediate rail system C which connects the first and second rail systems A, B. In order for the remotely operated vehicle 30 to be able to receive storage containers 106 onto its container carrier 35 from the container handling vehicles operating on the first and second rail systems A, B, an upper surface of the intermediate rail system C is typically at a lower elevation than an upper surface of the first and second rail systems A, B. The upper surface of the first and second rail systems A, B may be on the same level or on different levels, however the upper surfaces of both the first and second rail systems A, B are preferably on a higher elevation than the upper surface of the intermediate rail system C.

In the example of FIGS. 8A-8C the first rail system A and the intermediate rail system C have the same orientation, i.e. a first orientation, while the second rail system B has a perpendicular orientation, i.e. a second orientation, relative the first orientation.

Both the first and second automated storage and retrieval systems may comprise a container handling vehicle rail system 108 comprising a first set of parallel rails 110 arranged in a horizontal plane P and extending in a first direction X, and a second set of parallel rails 111 arranged in the horizontal plane and extending in a second direction Y which is perpendicular to the first direction X. The first and second sets of rails 110, 111 form a grid pattern in the horizontal plane comprising a plurality of adjacent container handling vehicle grid cells 122, each container handling vehicle grid cell 122 comprising a container handling vehicle grid opening 115 defined by a pair of neighboring rails of the first set of rails 110 and a pair of neighboring rails of the second set of rails 111. The systems further comprise a plurality of stacks of storage containers arranged in storage columns located beneath the container handling vehicle rail system 108, wherein each storage column is located vertically below a container handling vehicle grid opening 115.

In operation, referring to FIG. 8A, when a storage container 106 is to be transferred between a container handling vehicle operating on the first rail system A and a container handling vehicle operating on the second rail system B, a first container handling vehicle, disclosed as a cantilever storage container vehicle 301-A type, operating on the first rail system A retrieves a storage container 106 from a stack and positions itself with its lifting device directly above a grid cell 322 of the intermediate rail system B.

Referring to FIG. 8B, the remotely operated delivery vehicle 30 has positioned itself under the lifting device of the cantilever storage container vehicle 301-A, with the container carrier in the same orientation as the cantilever storage container vehicle 301-A, i.e. the first orientation. The cantilever storage container vehicle 301-A can now lower the storage container onto the container carrier 35 of the remotely operated delivery vehicle 30.

Referring to FIG. 8C, the remotely operated delivery vehicle 30 can then rotate the container carrier 35, and thus the storage container 106, in accordance with the second orientation using the rotational drive, such that the storage container 106 is oriented in the same direction as a cantilever storage container vehicle 301-B operating on the second rail system B. Further, the remotely operated delivery vehicle 30 can position itself preferably directly under the lifting device of the cantilever storage container vehicle 301-B, with the container carrier in the same orientation as the cantilever storage container vehicle 301-B, i.e. the second orientation. The cantilever storage container vehicle 301-B can now retrieve the storage container from the container carrier 35 of the remotely operated delivery vehicle 30. The steps of rotating the container carrier 35 and moving the remotely operated delivery vehicle 30 between the position below the cantilever storage container vehicle 301-A operating on the first rail system A and the position below the cantilever storage container vehicle 301-B operating on the second rail system B can be switched, i.e. the remotely operated delivery vehicle 30 may first move between the first and second rail systems A, B and then, after arriving below the second rail system B, rotate the container carrier 35 and thus the storage container 106.

Once the cantilever storage container vehicle 301-B has lifted the storage container 106 it may store the storage container 106 at a storage position within the second automated storage and retrieval system B or deliver the storage container to a port or a picking station.

Figure 9A:
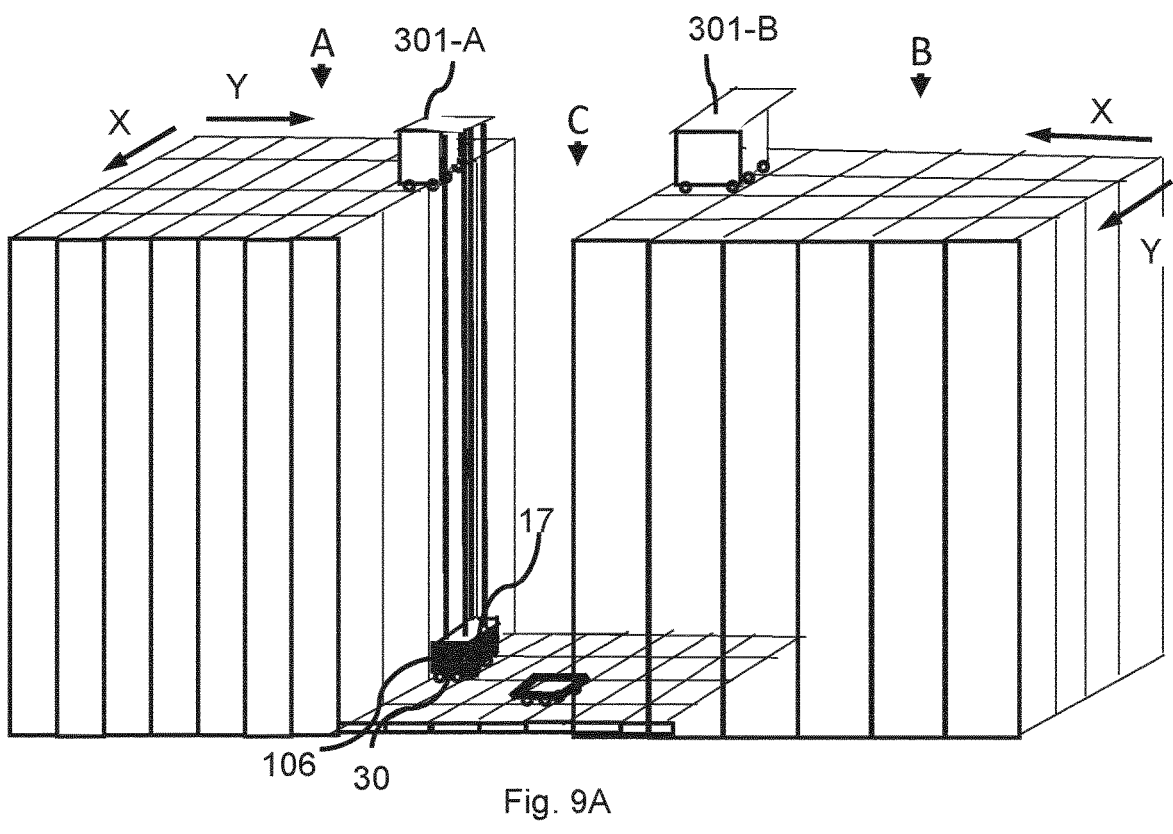
FIG. 9A is a side view illustrating a similar setup as in FIG. 8B, but where the shape of the second automated storage and retrieval system and thus the intermediate rail system are a different layout.

FIG. 9A is a side view illustrating a similar setup as in FIG. 8B, but where the shape of the second automated storage and retrieval system B and thus the intermediate rail system C are somewhat different. Furthermore, the intermediate rail system B extends into the second automated storage and retrieval system B. In addition, for the sake of simplicity, many of the container handling vehicles present in FIG. 8A have been removed such that there is only one container handing vehicle 301-A, 301-B operating on each of the first and second rail systems A, B, respectively, as well as two remotely operated delivery vehicles 30 on the intermediate rail system B.

In the specific setup in FIG. 9A, the container handling vehicle 301-A operating on the first rail system A has lowered a lifting frame 17 of the lifting device and is about to load a storage container onto the remotely operated delivery vehicle 30 on the intermediate rail system B.

Figure 9B:
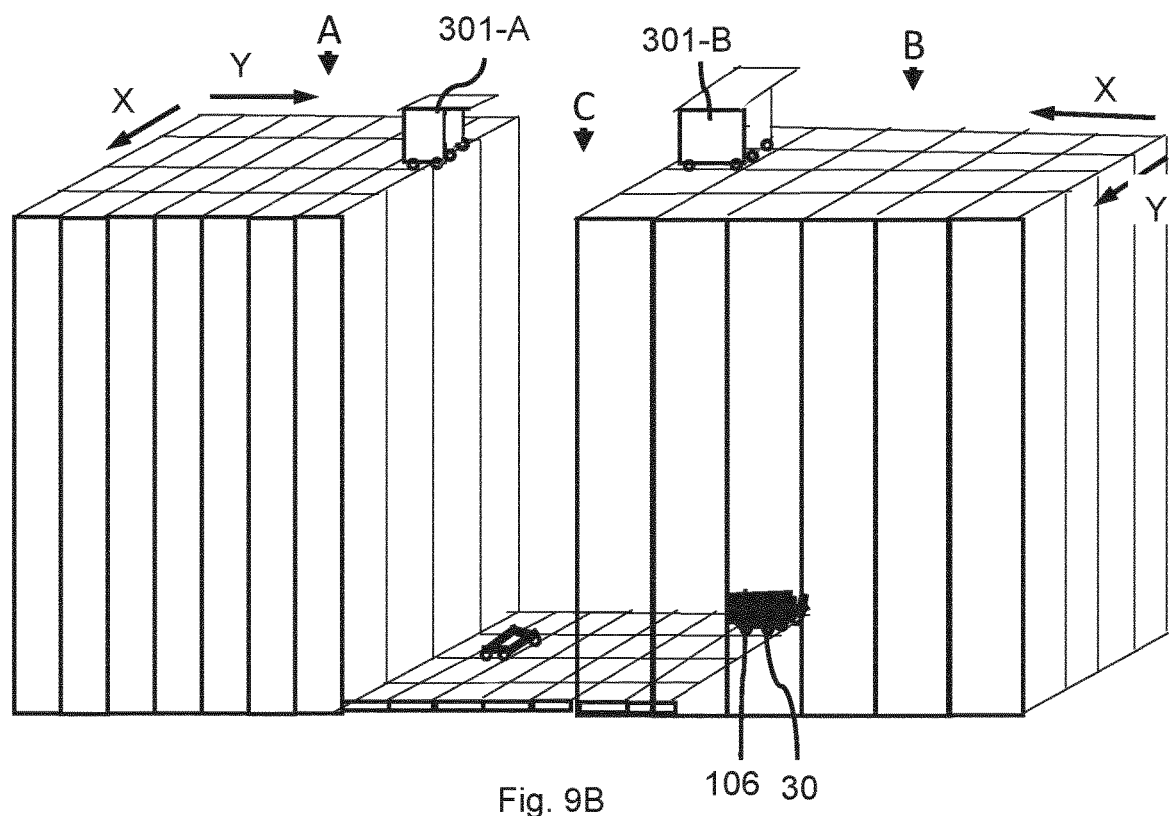
FIG. 9B is a side view illustrating the situation after the storage container has been loaded onto the remotely operated vehicle and the remotely operated vehicle has moved to a position below the rail system of the second automated storage and retrieval system of FIG. 9A.

FIG. 9B is a side view illustrating the situation after the storage container 106 has been loaded onto the remotely operated vehicle 30 and the remotely operated vehicle 30 has moved to a position below a container handling vehicle 301-B operating on the second rail system 1 of the second automated storage and retrieval system of FIG. 9A.

Although not disclosed in FIG. 9B, it is apparent that as the intermediate rail system B extends into a volume of the second automated storage and retrieval systems A, B, such as e.g. disclosed in FIGS. 4-10 in WO 2019/238694 A1, which is incorporated herein by reference. Also prior art storage container vehicles 201-A, 201-B with the lifting devices located within the vehicle body may be used to load and retrieve storage containers 106 onto and from the container carrier 35 of the remotely operated delivery vehicle 30.

Challenges with respect to alignment may occur as the cell positions between the upper rail system (A and/or B) may not be not oriented the same direction as the intermediate rail system (C) and the vehicles involved in the transfer cannot simply position themselves in the center of a cell in order to secure alignment. In order to solve this, different actions may be taken to ensure proper alignment, such as e.g.:

a) It is possible to make dedicated transfer cells on the intermediate rail system which are aligned with the connected first or second rail system such that the transfer of storage container(s) between the container handling vehicles and the delivery vehicle is eased and aligned.

b) Alternatively, or additionally, the delivery vehicle may have dedicated transfer positions where the rotated container carrier is directly below container handling vehicles in dedicated transfer columns.

For both a) and/or b) the transfer cells or transfer positions may have sensors/barriers etc. securing/ensuring that the delivery vehicle is properly positioned before the transfer of storage container is performed. I.e. there might be just one position 'drop off' position where everything can line up, where the midpoints of the respective grid cells for the vehicles involved in the transfer can be aligned. Alternatively, or additionally, the transfer cells or transfer positions may have a center which is equal for the first or second rail system and the intermediate rail system.

In the preceding description, various aspects of an automated storage and retrieval system according to the invention have been described with reference to the illustrative embodiment. However, this description is not intended to be construed in a limiting sense. Various modifications and variations of the illustrative embodiment, as well as other embodiments of the system, which are apparent to persons skilled in the art, are deemed to lie within the scope of the present invention as defined by the following claims.

| List of reference numbers | |
| --- | --- |
| 1 | Prior art storage and retrieval system |
| 2 | Wheel base unit/Vehicle base |
| 4, 4' | Electric motor |
| 6 | Rechargeable battery |
| 7 | Wheel displacement assembly |
| 8 | Electric motor for wheel displacement assembly |
| 9 | Top panel/flange |
| 10 | Through-holes |
| 17 | Lifting frame |
| 20 | Centre opening |
| 21 | Electronic control system |
| 30 | Remotely operated delivery vehicle |
| 32a, 32b | Wheel arrangement, first and second set of wheels |
| 33 | Conveyor on container carrier |
| 51 | First set of parallel rails in first direction (X) |
| 51a, 51b | Tracks of first set of rails |
| 52 | Second set of parallel rail in second direction (Y) |
| 52a, 52b | Tracks of second set of rails |
| 100 | Framework structure |
| 102 | Upright members of framework structure |
| 103 | Horizontal members of framework structure |
| 104 | Storage grid |
| 105 | Storage column |
| 106 | Storage container |
| 106' | Particular position of storage container |
| 107 | Stack |
| 108 | Rail system |
| 110 | First set of parallel rails in first direction (X) |
| 110a, 110b | Tracks of first set of rails |
| 111 | Second set of parallel rail in second direction (Y) |
| 111a, 111b | Tracks of second set of rails |
| 112 | Access opening/grid column |
| 115 | Grid opening |
| 119 | First port column |
| 120 | Second port column |
| 122 | Grid cell |
| 200 | Prior art delivery vehicle |
| 201, 201-A, 201-B | Prior art storage container vehicle |
| 201a | Vehicle body of the storage container vehicle 201 |
| 201b | Drive means/wheel arrangement, first direction (X) |
| 201c | Drive means/wheel arrangement, second direction (Y) |
| 300 | Framework structure (lower rail system) |
| 301, 301-A, 301-B | Prior art cantilever storage container vehicle |
| 301a | Vehicle body of the storage container vehicle 301 |
| 301b | Drive means in first direction (X) |
| 301c | Drive means in second direction (Y) |
| 304 | Parts of the gripping device of the container handling vehicle 301 |
| 308 | Lower rail system/delivery rail system |
| 315 | Grid opening (Lower rail system) |
| 322 | Grid cell |
| 352 | Storage container support |
| 360 | Slewing bearing/ring gear |
| 361 | Gear motor |
| 362 | Gear |
| 370 | Piston cylinder apparatus |
| 371 | Cylinder |
| 372 | Piston rod |
| 373 | Common rotatable plate |
| 400 | External conveyor |
| 500 | Control system |
| A | First rail system/first automated storage and retrieval system |

18

-continued

| List of reference numbers | |
| --- | --- |
| B | Second rail system/second automated storage and retrieval system |
| C | Intermediate rail system |
| P | Horizontal plane |

The invention claimed is:

1. A remotely operated delivery vehicle for transport of a storage container, the remotely operated delivery vehicle comprising:
a vehicle base comprising rolling devices configured to move the remotely operated delivery vehicle in a horizontal plane along tracks of a rail system comprising a first set of parallel rails arranged in a first direction and a second set of parallel rails arranged in a second direction perpendicular to the first direction, wherein when in a horizontal plane, the vehicle base has a longitudinal extension which is longer than a transverse extension;
rolling device motors for driving the rolling devices,
a power source configured to provide propulsion power to the rolling device motors,
a container carrier supported by the vehicle base, wherein the container carrier is configured to receive the storage container from above and/or from a side and onto or at least partly into the container carrier, wherein a longitudinal extension and transverse extension of the container carrier is substantially equal to the longitudinal extension and transverse extension of the vehicle base and
a rotational drive configured to rotate the container carrier in the horizontal plane, and any storage container supported thereon, relative the vehicle base.

2. The remotely operated delivery vehicle according to claim 1, wherein the container carrier comprises a compartment for containing at least part of the storage container.

3. The remotely operated delivery vehicle according to claim 1, wherein the rotational drive comprises a rotatable bearing in a form of a ring gear.

4. The remotely operated vehicle according to claim 3, wherein the ring gear is of a diameter corresponding to over 50% of a width of the delivery vehicle.

5. The remotely operated vehicle according to claim 1, wherein the rotational drive is higher than an upper part of a vehicle body and supports the container carrier such that it is formed a gap between the upper part of the vehicle body and the container carrier.

6. The remotely operated vehicle according to claim 1, wherein the rotational drive is mounted in a recess of the vehicle base.

7. The remotely operated vehicle according to claim 1, wherein the rotational drive allows at least 90 degrees rotation.

8. The remotely operated vehicle according to claim 1, wherein rotational drive comprises an encoder to measure rotation of the container carrier relative the vehicle base.

9. The remotely operated delivery vehicle according to claim 3, wherein the rotational drive further comprises a gear motor and a gear rotationally connected to the gear motor, wherein the gear is rotationally connected to the rotatable bearing.

10. The remotely operated delivery vehicle according to claim 1, wherein the rotational drive comprises a piston cylinder apparatus comprising a cylinder and a piston rod movable relative the cylinder, wherein the piston cylinder apparatus is operable by a pressurized fluid flowing into and out of the cylinder.

11. The remotely operated delivery vehicle according to claim 10, wherein the piston cylinder apparatus comprises at least one pair of parallel cylinders with piston rods, wherein the cylinders are connectable to a vehicle body and the piston rods are connectable on opposite sides of a common rotatable plate.

12. The remotely operated vehicle according to claim 11, wherein the cylinders of one pair of parallel cylinders are oriented in opposite directions, such that when the cylinders in one pair of parallel cylinders are pressurized, the piston rod extends out from the cylinder and the common rotatable plate rotates.

13. An automated storage and retrieval system comprising:

a first automated storage and retrieval system comprising a first rail system having a first orientation, wherein the first rail system of the first automated storage and retrieval system comprises:

a container handling vehicle rail system comprising a first set of parallel rails arranged in a horizontal plane and extending in a first direction, and a second set of parallel rails arranged in the horizontal plane and extending in a second direction which is perpendicular to the first direction, wherein first and second sets of rails form a grid pattern in the horizontal plane comprising a plurality of adjacent container handling vehicle grid cells, each container handling vehicle grid cell comprising a container handling vehicle grid opening defined by a pair of neighboring rails of the first set of rails and a pair of neighboring rails of the second set of rails; and a plurality of stacks of storage containers arranged in storage columns located beneath the container handling vehicle rail system, wherein each storage column is located vertically below a container handling vehicle grid opening; wherein the automated storage and retrieval system further comprises:

a remotely operated delivery vehicle for transport of a storage container, the remotely operated delivery vehicle comprising:

a vehicle base comprising rolling devices configured to move the remotely operated delivery vehicle in a horizontal plane along tracks of a rail system comprising a first set of parallel rails arranged in a first direction and a second set of parallel rails arranged in a second direction perpendicular to the first direction, wherein when in a horizontal plane, the vehicle base has a longitudinal extension which is longer than a transverse extension;

rolling device motors for driving the rolling devices, a power source configured to provide propulsion power to the rolling device motors, a container carrier supported by the vehicle base, wherein the container carrier is configured to receive the storage container from above and/or from a side and onto or at least partly into the container carrier wherein a longitudinal extension and a transverse extension of the container carrier is substantially equal to the longitudinal extension and the transverse extension of the vehicle base; and a rotational drive configured to rotate the container carrier in the horizontal plane, and any storage container supported thereon, relative the vehicle base, and an intermediate rail system connected to the first automated storage and retrieval system, wherein the intermediate rail system comprises a first set of parallel rails arranged to guide movement of the remotely operated delivery vehicle in a first direction across a top of the intermediate rail system, and a second set of parallel rails arranged perpendicular to the first set of rails to guide movement of the remotely operated delivery vehicle in a second direction which is perpendicular to the first direction.

14. The automated storage and retrieval system according to claim 13, further comprising:

a second automated storage and retrieval system comprising a second rail system having a different, second, orientation relative the first orientation, wherein the second rail system of the second automated storage and retrieval system comprises:

a container handling vehicle rail system comprising a first set of parallel rails arranged in a horizontal plane and extending in a first direction, and a second set of parallel rails arranged in the horizontal plane and extending in a second direction which is perpendicular to the first direction, wherein first and second sets of rails form a grid pattern in the horizontal plane comprising a plurality of adjacent container handling vehicle grid cells, each container handling vehicle grid cell comprising a container handling vehicle grid opening defined by a pair of neighboring rails of the first set of rails and a pair of neighboring rails of the second set of rails; and a plurality of stacks of storage containers arranged in storage columns located beneath the container handling vehicle rail system, wherein each storage column is located vertically below a container handling vehicle grid opening; and wherein the intermediate rail system is connected to the second automated storage and retrieval system.

15. The automated and retrieval system according to claim 13, comprising an external conveyor arranged at or close to the intermediate rail system, wherein the external conveyor has a different, second, orientation relative the first orientation.

16. A method of transferring a storage container between a first automated storage and retrieval system comprising a first rail system having a first orientation and a second automated storage and retrieval system comprising a second rail system having a different, i.e. second, orientation relative the first orientation, wherein the first and second rail systems of the first and second automated storage and retrieval systems both comprise:

a container handling vehicle rail system comprising a first set of parallel rails arranged in a horizontal plane and extending in a first direction, and a second set of parallel rails arranged in the horizontal plane and extending in a second direction which is perpendicular to the first direction, wherein first and second sets of rails form a grid pattern in the horizontal plane comprising a plurality of adjacent container handling vehicle grid cells, each container handling vehicle grid cell comprising a container handling vehicle grid opening defined by a pair of neighboring rails of the first set of rails and a pair of neighboring rails of the second set of rails; and a plurality of stacks of storage containers arranged in storage columns located beneath the container handling vehicle rail system, wherein each storage column is located vertically below a container handling vehicle grid opening;

wherein the method comprises:

utilizing a first container handling vehicle operating on the first rail system to load a storage container on a container carrier of a remotely operated delivery vehicle for transport of a storage container, the remotely operated delivery vehicle comprising:

a vehicle base comprising rolling devices configured to move the remotely operated delivery vehicle in a horizontal plane along tracks of a rail system comprising a first set of parallel rails arranged in a first direction and a second set of parallel rails arranged in a second direction perpendicular to the first direction, rolling device motors for driving the rolling devices, a power source configured to provide propulsion power to the rolling device motors, a container carrier supported by the vehicle base, wherein the container carrier is configured to receive the storage container from above and/or from a side and onto or at least partly into the container carrier, and a rotational drive configured to rotate the container carrier, and any storage container supported thereon, relative the vehicle base, wherein the remotely operated delivery vehicle operates on an intermediate rail system connected to both the first and second automated storage and retrieval systems, wherein the container carrier and the first container handling vehicle are oriented in accordance with the first orientation, moving the remotely operated delivery vehicle to a position next to the second automated storage and retrieval system, rotating the container carrier, and thus the storage container, in accordance with the second orientation using the rotational drive, positioning a second container handling vehicle operating on the second rail system, and which has the second orientation, directly above the container carrier of the remotely operated delivery vehicle, lifting the storage container off the container carrier utilizing a lifting device of the second container handling vehicle.

17. A method of transferring a storage container between an automated storage and retrieval system comprising a rail system having a first orientation and an external conveyor having a different, second, orientation relative the first orientation, wherein the automated storage and retrieval systems comprise:

a container handling vehicle rail system comprising a first set of parallel rails arranged in a horizontal plane and extending in a first direction, and a second set of parallel rails arranged in the horizontal plane and extending in a second direction which is perpendicular to the first direction, wherein the first and second sets of rails form a grid pattern in the horizontal plane comprising a plurality of adjacent container handling vehicle grid cells, each container handling vehicle grid cell comprising a container handling vehicle grid opening defined by a pair of neighboring rails of the first set of rails and a pair of neighboring rails of the second set of rails; and a plurality of stacks of storage containers arranged in storage columns located beneath the container handling vehicle rail system, wherein each storage column is located vertically below a container handling vehicle grid opening; wherein the method comprises:

utilizing a first container handling vehicle to load a storage container on a container carrier of a remotely operated delivery vehicle for transport of a storage container, the remotely operated delivery vehicle comprising:

a vehicle base comprising rolling devices configured to move the remotely operated delivery vehicle in a horizontal plane along tracks of a rail system comprising a first set of parallel rails arranged in a first direction and a second set of parallel rails arranged in a second direction perpendicular to the first direction, rolling device motors for driving the rolling devices, a power source configured to provide propulsion power to the rolling device motors, a container carrier supported by the vehicle base, wherein the container carrier is configured to receive the storage container from above and/or from a side and onto or at least partly into the container carrier, and a rotational drive configured to rotate the container carrier, and any storage container supported thereon, relative the vehicle base, wherein the container carrier and the first container handling vehicle are oriented in accordance with the first orientation, rotating the container carrier of the remotely operated delivery vehicle, and thus the storage container, in accordance with the second orientation, using the rotational drive, moving the remotely operated delivery vehicle next to the external conveyor, unloading the storage container from the container carrier to the external conveyor.

18. A method for rotating a storage container such as to transfer a storage container between a first and second automated storage and retrieval system with different orientation of rail systems, the method comprising rotating a storage container utilizing a remotely operated delivery vehicle according to claim 1.

* * * * *